(12) United States Patent
Shiina et al.

(10) Patent No.: US 12,096,435 B2
(45) Date of Patent: Sep. 17, 2024

(54) COMMUNICATION SYSTEM

(71) Applicant: NIPPON TELEGRAPH AND TELEPHONE CORPORATION, Tokyo (JP)

(72) Inventors: Ryota Shiina, Musashino (JP); Tatsuya Fukui, Musashino (JP); Satoshi Narikawa, Musashino (JP); Katsuya Minami, Musashino (JP); Satoshi Ikeda, Musashino (JP); Shunsuke Saruwatari, Musashino (JP); Takashi Watanabe, Musashino (JP); Kazuhiko Kinoshita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/768,456

(22) PCT Filed: Oct. 13, 2020

(86) PCT No.: PCT/JP2020/038570
§ 371 (c)(1),
(2) Date: Apr. 12, 2022

(87) PCT Pub. No.: WO2021/085111
PCT Pub. Date: May 6, 2021

(65) Prior Publication Data
US 2024/0121780 A1    Apr. 11, 2024

(30) Foreign Application Priority Data
Oct. 29, 2019   (JP) .................................. 2019-196332

(51) Int. Cl.
*H04W 72/20*   (2023.01)
*H04B 10/2575*   (2013.01)
(Continued)

(52) U.S. Cl.
CPC ........ *H04W 72/20* (2023.01); *H04B 10/2575* (2013.01); *H04B 10/27* (2013.01); *H04W 88/10* (2013.01)

(58) Field of Classification Search
CPC ... H04W 72/20; H04W 88/10; H04B 10/2575
See application file for complete search history.

(56) References Cited

PUBLICATIONS

T. Braun et al., Virtual Private Network Architecture, Technical Report, Apr. 1999.
(Continued)

*Primary Examiner* — Samina F Choudhry
(74) *Attorney, Agent, or Firm* — Harness, Dickey & Pierce, P.L.C.

(57) ABSTRACT

An object is to provide a communication system in which there are no restrictions on a communicable area and it is not necessary to install communication software on a wireless device. A communication system according to the present invention is configured so that the functions of a wireless access point are separated into a front-end unit on a wireless terminal side and a back-end side on the Internet side, radio signal processing functions supporting a wireless scheme of the wireless terminal are deployed only on the back end, and only relatively simple processing functions such as E/O conversion are deployed on the front end near the wireless terminal 311.

6 Claims, 15 Drawing Sheets

(51) Int. Cl.
    *H04B 10/27*     (2013.01)
    *H04W 88/10*     (2009.01)

(56)     References Cited

PUBLICATIONS

Hiroaki Hata, An Integration Method of L2 Forwarding and Port Forwarding SSL-VPN and the Application to M2M networks, IEICE Technical Report, vol. 114, No. 307, 2014, pp. 13-18.
Eizen Kimura, The Design of Virtual Private Network for Regional Medical Information Network, Medical Informatics, vol. 22, No. 6, 2002, pp. 465-474.

Fig. 12

[12] TABLE 1. DATABASE INFORMATION WHEN SD-AP-BE IS LINKED TO ONE USER

| USER INFORMATION | OWNED TERMINAL (MAC ADDRESS) | AP-BE |
|---|---|---|
| a00000001 | xx-xx-xx-xx-c6-10 | be00000001 |
| | xx-xx-xx-xx-e6-66 | be00000001 |
| | xx-xx-xx-xx-a5-60 | be00000001 |
| a00000002 | xx-xx-xx-xx-c7-55 | be00000002 |
| | xx-xx-xx-xx-d6-33 | be00000002 |
| ... | ... | ... |

Fig. 13

[13] TABLE 2. DATABASE INFORMATION WHEN SD-AP-BE IS LINKED TO ONE USER AND IS DIFFERENT FOR EACH WIRELESS SCHEME

| USER INFORMATION | OWNED TERMINAL (MAC ADDRESS) | WIRELESS SCHEME | AP-BE |
|---|---|---|---|
| a00000001 | xx-xx-xx-xx-c6-10 | WIRELESS SCHEME A | be00000001 |
| | xx-xx-xx-xx-e6-66 | WIRELESS SCHEME B | be00000002 |
| | xx-xx-xx-xx-a5-60 | WIRELESS SCHEME B | be00000002 |
| a00000002 | xx-xx-xx-xx-c7-55 | WIRELESS SCHEME A | be00000003 |
| | xx-xx-xx-xx-d6-33 | WIRELESS SCHEME C | be00000003 |
| ... | ... | | |

Fig. 14

[14] TABLE 3. DATABASE INFORMATION WHEN SD-AP-BE IS LINKED TO n USERS

| USER INFORMATION | OWNED TERMINAL (MAC ADDRESS) | AP-BE |
|---|---|---|
| a00000001 | xx-xx-xx-xx-c6-10 | be00000001 |
| | xx-xx-xx-xx-e6-66 | be00000001 |
| | xx-xx-xx-xx-a5-60 | be00000001 |
| a00000002 | xx-xx-xx-xx-c7-55 | be00000001 |
| | xx-xx-xx-xx-d6-33 | be00000001 |
| a00000003 | xx-xx-xx-xx-e2-12 | be00000002 |
| ... | ... | ... |

Fig. 15

[15] TABLE 4. DATABASE INFORMATION WHEN SD-AP-BE IS LINKED TO n USERS AND IS DIFFERENT FOR EACH WIRELESS SCHEME

| USER INFORMATION | OWNED TERMINAL (MAC ADDRESS) | WIRELESS SCHEME | AP-BE |
|---|---|---|---|
| a00000001 | xx-xx-xx-xx-c6-10 | WIRELESS SCHEME A | be00000001 |
| | xx-xx-xx-xx-e6-66 | WIRELESS SCHEME B | be00000002 |
| | xx-xx-xx-xx-a5-60 | WIRELESS SCHEME B | be00000002 |
| a00000002 | xx-xx-xx-xx-c7-55 | WIRELESS SCHEME A | be00000001 |
| | xx-xx-xx-xx-d6-33 | WIRELESS SCHEME C | be00000003 |
| a00000003 | xx-xx-xx-xx-e2-12 | WIRELESS SCHEME B | be00000002 |
| ... | ... | | ... |

COMMUNICATION SYSTEM

CROSS-REFERENCE TO RELATED APPLICATIONS

This application is a 371 U.S. National Phase of International Application No. PCT/JP2020/038570 filed on Oct. 13, 2020, which claims priority to Japanese Application No. 2019-196332 filed on Oct. 29, 2019. The entire disclosures of the above applications are incorporated herein by reference.

TECHNICAL FIELD

The present disclosure relates to a communication system for making it possible to connect various devices having different wireless schemes to one's own private network environment.

BACKGROUND ART

With the development of information and communication technology in recent years, communication networks have become widespread, and communication environments have been realized that make it possible to easily connect to the Internet via wired and wireless communication. For example, in wired communication, FTTH (Fiber-To-The-Home) is used to realize wide-area optical communication from an accommodation station of communication facilities to a user base, and Wi-Fi, which is unlicensed radio, or the like is used in the user base, thereby realizing communication in which wired communication and wireless communication are combined.

In such a communication environment as described above, everyone can enjoy inexpensive and high-speed access to the Internet, but there are problems in terms of communication security, so that a connection scheme using a dedicated line or a VPN (virtual private network) connection scheme using a virtual dedicated line has been used (see, e.g., Non-Patent Literature 1). By using them, everyone can connect to their own private network environment by realizing communication between bases via the Internet.

On the other hand, communication terminals have diversified in recent years, and various sensor devices have become widespread in addition to PCs, tablets, smartphones, and the like. In order to accommodate all sensor devices that acquire biological information or acquire external environmental information, communication schemes for IoT (Internet of Things) such as LPWA are widely used depending on services. Since information obtained from such sensor devices also contains much information that is easily misused, such as that linked to personal information, like biological information, there is a need to connect to one's own private network environment in order to realize more secure communication.

CITATION LIST

Non-Patent Literature

Non-Patent Literature 1: T. Braun, M. Gunter, M. Kasumi and I. Khalil, "Virtual Private Network Architecture," Technical Report, IAM-99-001, CATI, April 1999.
Non-Patent Literature 2: HATA Hiroaki, "An Integration Method of L2 Forwarding and Port Forwarding SSL-VPN and the Application to M2M networks", IEICE technical report, vol. 114, no. 307, pp. 13-18, 2014.
Non-Patent Literature 3: KIMURA Eizen, "The Design of Virtual Private Network for Regional Medical Information Network", Japan journal of medical informatics, vol. 22, no. 6, pp. 465-474, 2002.

SUMMARY OF THE INVENTION

Technical Problem

There are the following problems in order to connect PCs, tablets, smartphones, and even IoT devices to one's own private environment using the existing VPN connection scheme (see, e.g., Non-Patent Literatures 2-3).
(1) Restrictions on Communicable Area
As shown in FIG. 1, when trying to connect wireless terminals 112 and 122 supporting any wireless scheme to a private network environment 141 at another base via the Internet 131 using the VPN connection scheme, the communicable areas may be restricted depending on the wireless schemes of wireless APs (access points) 113 and 123 to which the wireless terminals 112 and 122 are connected. For example, in an area A111, since the wireless scheme of the wireless AP 113 supports the wireless scheme of the wireless terminal 112, the wireless terminal 112 can be connected. However, in an area B121, since the communication scheme of the wireless AP 123 is different from the wireless scheme of the wireless terminal 122, the wireless terminal 122 cannot perform communication. As described above, there has been a problem that the communicable area is restricted when the existing VPN connection scheme is used.
(2) Resource Securement in Wireless Devices
Further, in the VPN connection scheme, it is necessary to install dedicated VPN client software on the wireless terminal. The above-mentioned software can be driven on smartphones and tablets. However, there has been a problem that it is difficult for wireless terminals with limited resources such as IoT devices to allocate sufficient resources to drive the software.

Due to these problems, it has been difficult to connect a wide variety of wireless devices to one's own private environment using the conventional VPN connection scheme.

Therefore, in order to solve the above problems, the present invention aims to provide a communication system in which there are no restrictions on a communicable area and it is not necessary to install communication software on a wireless device.

Means for Solving the Problem

The present invention is configured so that the functions are separated into an FE (front-end unit) of a wireless AP deployed in each area and a BE (back-end unit) deployed in an aggregate station building or the like, and an AP control mechanism for interconnecting the FE and the BE and a network control mechanism for controlling the network are provided.

Specifically, a communication system according to the present invention is a communication system having a function of an access point that connects the Internet and at least one wireless terminal, including:
a front-end unit that forms a wireless area, and performs wireless communication with the wireless terminal;
at least one back-end unit that is connected to the Internet;
a network that connects the front-end unit and the back-end unit; and a control unit that has a database that describes a relationship with the back-end unit corresponding to identification information of the wireless terminal, and controls the network so that an uplink signal from the wireless terminal and a downlink signal from the Internet are transmitted between the front-end unit and the back-end unit, wherein the control unit has:

a function of collecting terminal information including identification information and position information of the wireless terminal from the wireless terminal;

a function of selecting the front-end unit close to the wireless terminal based on the position information;

a function of selecting the back-end unit corresponding to the identification information collected from the wireless terminal according to the database; and a function of setting the network so that the selected front-end unit and the selected back-end unit are connected to each other.

In this communication system, since the BEs support various communication schemes of wireless terminals, the above problem (1) can be solved. Further, in this communication system, since the control unit grasps the situation of the wireless terminals to control the communication, the above problem (2) can be solved. Accordingly, the present invention can provide a communication system in which there are no restrictions on a communicable area and it is not necessary to install communication software on a wireless device.

The network in the communication system according to the present invention can be based on a Radio over Fiber (RoF) scheme.

The communication system according to the present invention can support various communication forms depending on the contents described in the database.

Example 1: The database is described so that one of the at least one back-end unit corresponds to one user of the wireless terminal. This example is a form in which a back-end unit is linked to one user.

Example 2: The database is described so that one of the at least one back-end unit is associated with one user, and the back-end unit is associated for each wireless scheme of the wireless terminal of the user. This example is a form in which a back-end unit is linked to one user, and is different for each wireless scheme.

Example 3: The at least one wireless terminal includes a plurality of wireless terminals, and the database is described so that one of the at least one back-end unit corresponds to a plurality of users of the wireless terminals. This example is a form in which a back-end unit is linked to a plurality of users.

Example 4: The at least one wireless terminal includes a plurality of wireless terminals, and the database is described so that one of the at least one back-end unit is associated with a plurality of users, and the back-end unit is associated for each wireless scheme of the wireless terminals of the users. This example is a form in which a back-end unit is linked to a plurality of users, and is different for each wireless scheme.

Effects of the Invention

The present invention can provide a communication system in which there are no restrictions on a communicable area and it is not necessary to install communication software on a wireless device. Since the existing VPN connection scheme is not used, a wide variety of devices can be connected to a user's own private environment regardless of the wireless schemes.

BRIEF DESCRIPTION OF DRAWINGS

FIG. 12 is a diagram illustrating a database included in a control unit of a communication system according to the present invention.

FIG. 13 is a diagram illustrating a database included in a control unit of a communication system according to the present invention.

FIG. 14 is a diagram illustrating a database included in a control unit of a communication system according to the present invention.

FIG. 15 is a diagram illustrating a database included in a control unit of a communication system according to the present invention.

DESCRIPTION OF EMBODIMENTS

Figure 1:
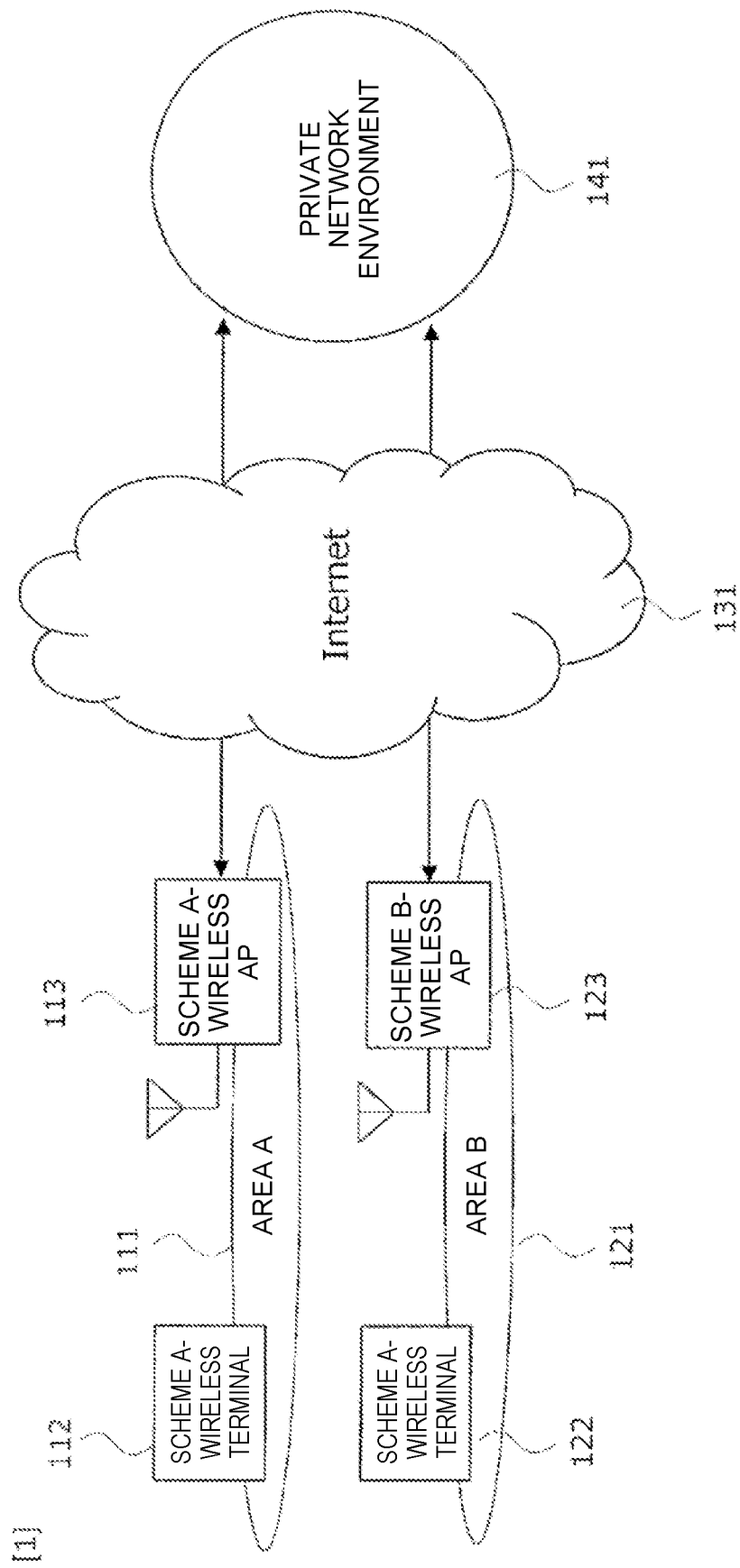
FIG. 1 is a diagram illustrating a communication system related to the present invention.

Hereinafter, embodiments of the present disclosure will be described in detail with reference to the drawings. Note that the present disclosure is not limited to the embodiments shown below. These example embodiments are merely examples, and the present disclosure can be embodied with various modifications and improvements based on the knowledge of those skilled in the art. Note that the components having the same reference numeral in the present specification and the drawings shall indicate the same one.

This embodiment is a communication system having a function of an access point that connects the Internet and at least one wireless terminal, including:

a front-end unit (wireless AP-FE) that forms a wireless area, and performs wireless communication with the wireless terminal;

at least one back-end unit (wireless AP-BE) that is connected to the Internet;

a network (NW) that connects the front-end unit and the back-end unit; and a control unit that has a database that describes a relationship with the back-end unit corresponding to identification information of the wireless terminal, and controls the network so that an uplink signal from the wireless terminal and a downlink signal from the Internet are transmitted between the front-end unit and the back-end unit.

The control unit has:

a function of collecting terminal information including identification information and position information of the wireless terminal from the wireless terminal;

a function of selecting the front-end unit close to the wireless terminal based on the position information;

a function of selecting the back-end unit corresponding to the identification information collected from the wireless terminal according to the database; and a function of setting the network so that the selected front-end unit and the selected back-end unit are connected to each other.

This communication system can realize the following configurations depending on the contents described in the database. Note that this embodiment will describe a case where the network is based on a Radio over Fiber (RoF) scheme. However, in the present invention, the network is not limited to the RoF scheme.

First Embodiment

Figure 2:
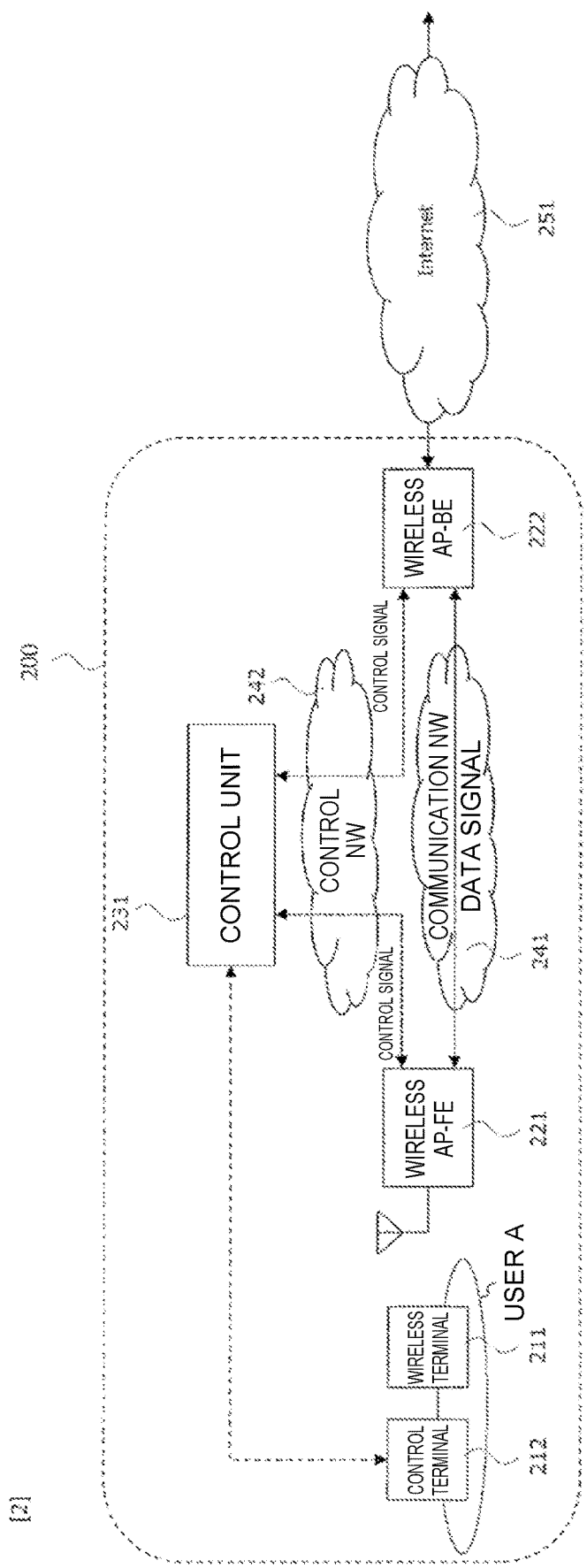
FIG. 2 is a diagram illustrating a communication system according to the present invention.

FIG. 2 is a diagram illustrating a communication system 200 of this embodiment. The communication network 200 includes a wireless terminal 211, a control terminal 211, a wireless AP-FE 221, a wireless AP-BE 222, a control unit 231, a communication NW 241, and a control NW 242. The communication network 200 communicates with the Internet 251. The control unit 231 has a database as shown in Table 1 of FIG. 12. That is, the database is described so that one wireless AP-BE 222 corresponds to one user of the wireless terminal 211.

When the wireless terminal 211 starts communication within the communication area of the wireless AP-FE 221, terminal information is first transmitted from the control terminal 212 to the control unit 231 deployed in an upper network through a user operation using an application or the like. The terminal information includes information capable of identifying the terminal such as a MAC (media access control) address of the wireless terminal 211 and current position information of the control terminal 212. Here, communication between the control terminal 212 and the control unit 231 may use a wired communication scheme such as Ethernet (R), or may use a wireless communication scheme such as licensed radio or unlicensed radio. Further, the wireless terminal 211 and the control terminal 212 may have a configuration in which the functions are separated as shown in FIG. 2, or may have an integrated configuration. Note that a request to retransmit the terminal information or the like is transmitted from the control unit 231 to the control terminal 212.

Upon receiving the terminal information transmitted from the control terminal 212, the control unit 231 performs, for example, collation with the database prepared in advance as shown in Table 1 of FIG. 12 based on the MAC address of the wireless terminal 211, and extracts the wireless AP-BE 222 linked to the wireless terminal 211 or the user who owns the wireless terminal 211. Furthermore, the control unit 231 uses the position information of the control terminal 212 to extract the wireless AP-FE 221 close to the position where the wireless terminal 212 or the user is present. Specifically, it is sufficient for the control unit 231 to create in advance a database of information on the position where each wireless AP-FE is located (latitude and longitude information in the case of two dimensions, or latitude, longitude, and altitude information in the case of three dimensions), and search for the wireless AP-FE at the position that is closest to the position of the terminal.

After extracting the wireless AP-BE 222 and the wireless AP-FE 221, the control unit 231 transmits a control signal to the wireless AP-BE 222 and the wireless AP-FE 221 via the control NW 242. Here, it is assumed that the control signal includes, for example, the terminal information such as the MAC address of the wireless terminal 211 and connection information between the wireless AP-BE 222 and the wireless AP-FE 221. Further, the control unit 231 transmits a control signal to communication apparatuses constituting the communication NW 241 between the wireless AP-BE 222 and the wireless AP-FE 221 (communication NW). By changing the set values of the communication apparatuses based on the control signal, the communication NW 241 is made controllable by the control unit 231.

A signal transmitted from the wireless terminal 211 via radio waves is received by the wireless AP-FE 221, and transmitted to the wireless AP-BE 222 via the communication NW 241. Here, the wireless AP-FE 221 converts the received RF (radio frequency) signal into an optical signal by E/O (electrical/optical) conversion, and transmits it to the wireless AP-BE 222. Further, the communication NW 241 is a network that transmits an RF signal as an optical signal, and may optically transmit a signal obtained by E/O-converting the carrier frequency used by the wireless terminal 211 as it is, or may optically transmit a signal obtained by E/O-converting an IF (intermediate frequency) signal that is obtained by frequency conversion from the carrier frequency, and the frequency of the RF signal does not matter. In this way, a signal from the wireless terminal 211 is transmitted to the upper-level Internet 251 via the wireless AP-FE 221, the communication NW 241, and the wireless AP-BE 222.

On the other hand, a downlink signal is transmitted from the wireless AP-BE 222 to the wireless AP-FE 221 via the communication NW 241. In the wireless AP-FE 221, the signal is O/E (optical/electrical)-converted, and the signal after the O/E conversion is transmitted to the wireless terminal via radio waves.

As described above, deploying the wireless AP-FE 221 and the communication NW 241 capable of optically transmitting RF signals between the wireless terminal 211 and the wireless AP-BE 222 produces the same effect as an increase in the transmission distance of the wireless section between the wireless terminal and the wireless AP. As a result, it is sufficient that a radio signal processing unit supporting the wireless scheme of the wireless terminal 211 is deployed only in the wireless AP-BE 222, and it is not required for the wireless AP-FE 221. Accordingly, if the wireless AP-FE 221 that implements only relatively simple processing such as E/O conversion is present near the wireless terminal 211, it becomes possible for the wireless terminal 211 to be always connected to the private wireless AP-BE 222 at a remote location. Note that the radio signal processing unit is a functional unit that performs radio signal processing that is carried out at a normal wireless access point, such as frequency conversion processing, radio modulation and demodulation processing, and framing/deframing processing according to the upper-level Internet 251.

Second Embodiment

Figure 3:
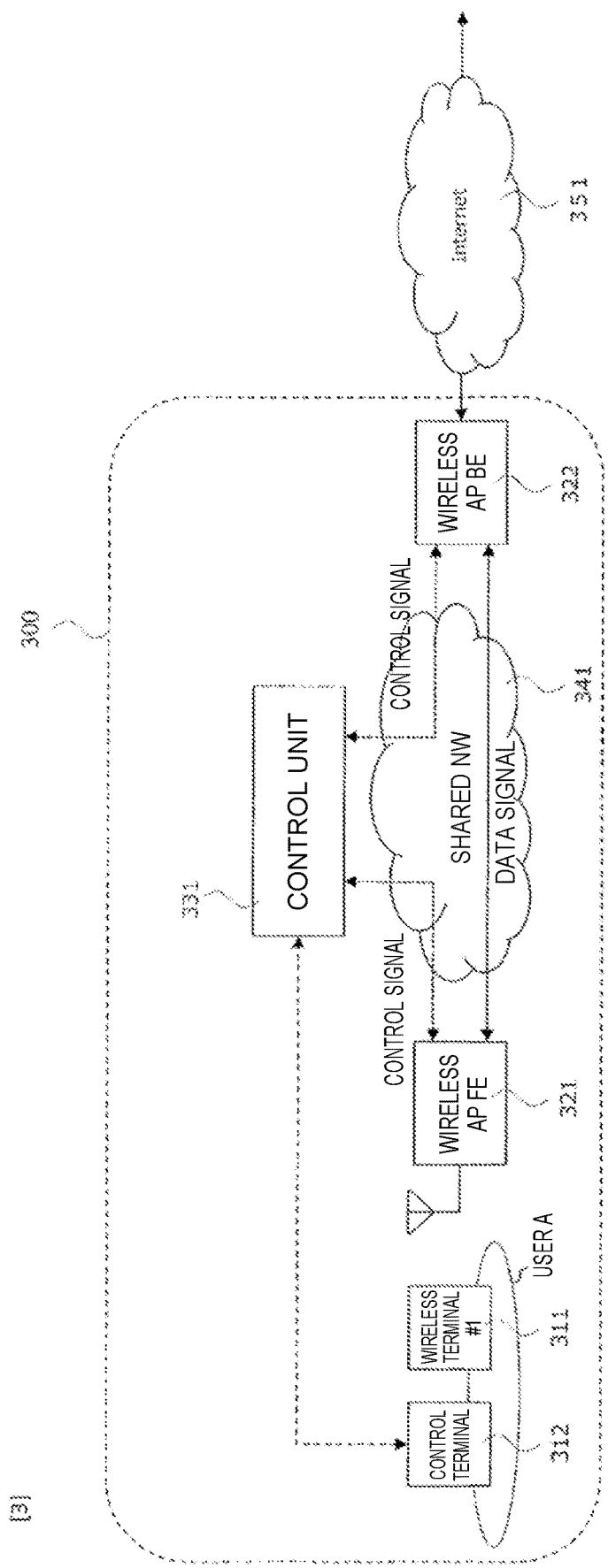
FIG. 3 is a diagram illustrating a communication system according to the present invention.

FIG. 3 is a diagram illustrating a communication system 300 of this embodiment. The communication network 300 includes a wireless terminal 311, a control terminal 312, a wireless AP-FE 321, a wireless AP-BE 322, a control unit 331, and a shared NW 341. The communication network 300 communicates with the Internet 351. In the communication system 200 of FIG. 2, the network between the wireless AP-FE 321 and the wireless AP-BE 322 is separated into the control NW 242 and the communication NW 241, but the communication system 300 uses the shared NW 341 in which the control NW 241 and the communication NW 242 are combined. The control unit 331 has a database as shown in Table 1 of FIG. 12. That is, the database is described so that one wireless AP-BE 322 corresponds to one user of the wireless terminal 311.

When the wireless terminal 311 starts communication within the communication area of the wireless AP-FE 321, terminal information is first transmitted from the control terminal 312 to the control unit 331 deployed in an upper network through a user operation using an application or the like. The terminal information includes information capable of identifying the terminal such as a MAC address of the wireless terminal 311 and current position information of the control terminal 312. Here, communication between the control terminal 312 and the control unit 331 may use a wired communication scheme such as Ethernet, or may use a wireless communication scheme such as licensed radio or unlicensed radio. Further, the wireless terminal 311 and the control terminal 312 may have a configuration in which the functions are separated as shown in FIG. 3, or may have an integrated configuration.

Upon receiving the terminal information transmitted from the control terminal 312, the control unit 331 performs, for example, collation with the database prepared in advance as shown in Table 1 of FIG. 12 based on the MAC address of the wireless terminal 311, and extracts the wireless AP-BE 322 linked to the wireless terminal 311 or the user who owns the wireless terminal 311. Furthermore, the control unit 331 uses the position information of the control terminal 312 to extract the wireless AP-FE 321 close to the position where the wireless terminal 312 or the user is present. Specifically, it is sufficient for the control unit 331 to create in advance a database of information on the position where each wireless AP-FE is located (latitude and longitude information in the case of two dimensions, or latitude, longitude, and altitude information in the case of three dimensions), and search for the wireless AP-FE at the position that is closest to the position of the terminal.

After extracting the wireless AP-BE 322 and the wireless AP-FE 321, the control unit 331 transmits a control signal to the wireless AP-BE 322 and the wireless AP-FE 321 via the shared NW 341. Here, it is assumed that the control signal includes, for example, the terminal information such as the MAC address of the wireless terminal 311 and connection information between the wireless AP-BE 322 and the wireless AP-FE 321. Further, the control unit 331 transmits a control signal to communication apparatuses constituting the shared NW 341 between the wireless AP-BE 322 and the wireless AP-FE 321. By changing the set values of the communication apparatuses based on the control signal, the shared NW 341 is made controllable by the control unit 331.

A signal transmitted from the wireless terminal 311 via radio waves is received by the wireless AP-FE 321, and transmitted to the wireless AP-BE 322 via the shared NW 341. Here, the wireless AP-FE 321 converts the received RF signal into an optical signal by E/O conversion, and transmits it to the wireless AP-BE 322. Further, the shared NW 341 is a network that transmits an RF signal as an optical signal, and may optically transmit a signal obtained by E/O-converting the carrier frequency used by the wireless terminal 312 as it is, or may optically transmit a signal obtained by E/O-converting an IF signal that is obtained by frequency conversion from the carrier frequency, and the frequency of the RF signal does not matter. In this way, a signal from the wireless terminal 311 is transmitted to the upper-level Internet 251 via the wireless AP-FE 321, the shared NW 341, and the wireless AP-BE 322.

On the other hand, a downlink signal is transmitted from the wireless AP-BE 322 to the wireless AP-FE 321 via the shared NW 341. In the wireless AP-FE 321, the signal is O/E-converted, and the signal after the O/E conversion is transmitted to the wireless terminal 311 via radio waves.

As described above, deploying the wireless AP-FE 321 and the shared NW 341 capable of optically transmitting RF signals between the wireless terminal 311 and the wireless AP-BE 322 produces the same effect as an increase in the transmission distance of the wireless section between the wireless terminal and the wireless AP. As a result, it is sufficient that a radio signal processing unit supporting the wireless scheme of the wireless terminal 311 is deployed only in the wireless AP-BE 322, and it is not required for the wireless AP-FE 321. Accordingly, if the wireless AP-FE 321 that implements only relatively simple processing such as E/O conversion is present near the wireless terminal 311, it becomes possible for the wireless terminal 311 to be always connected to the private wireless AP-BE 322 at a remote location.

Third Embodiment

Figure 4:
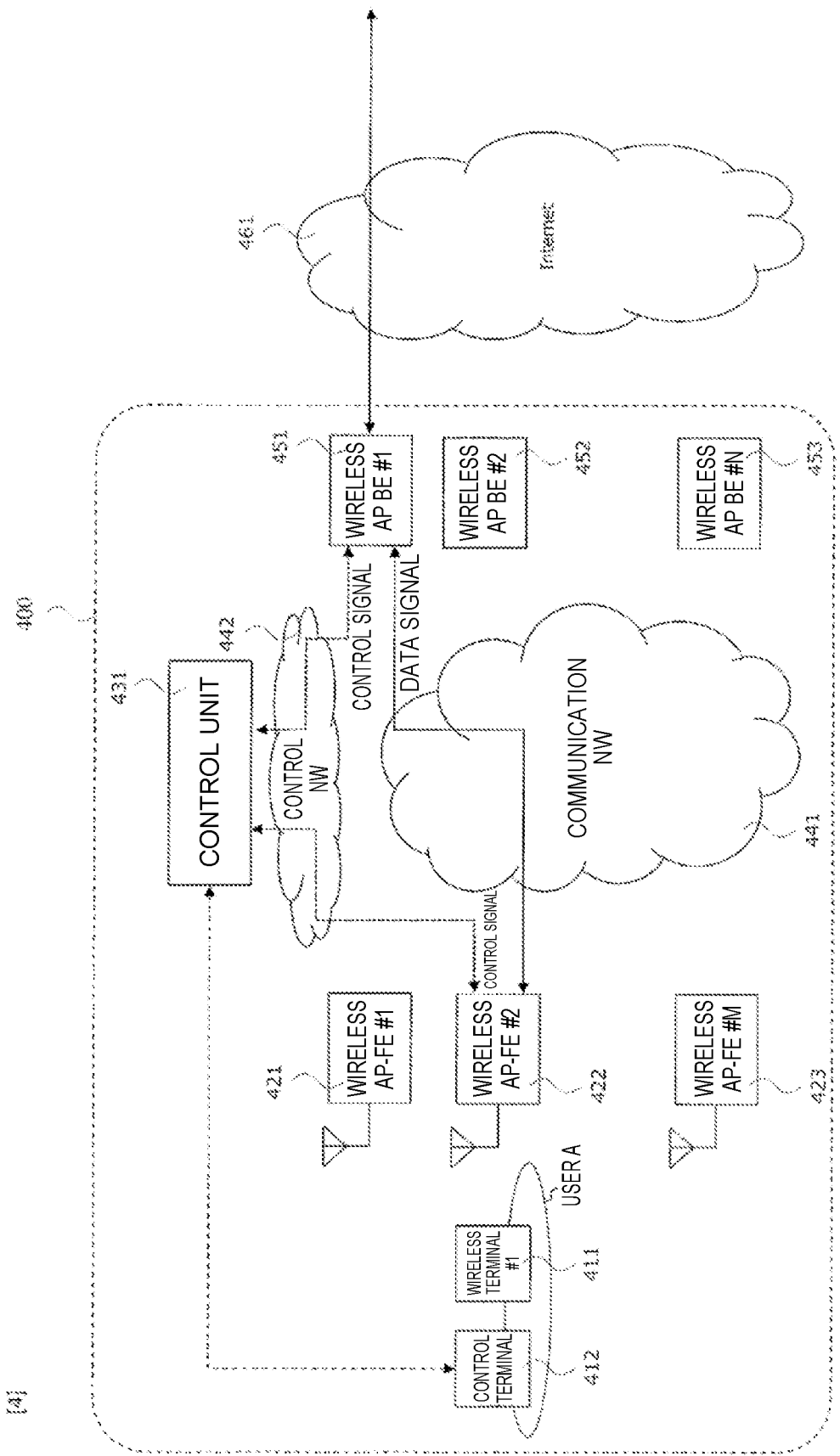
FIG. 4 is a diagram illustrating a communication system according to the present invention.

FIG. 4 is a diagram illustrating a communication system 400 of this embodiment. The communication network 400 includes a wireless terminal 411, a control terminal 412, a wireless AP-FE #1 421, a wireless AP-FE #2 422 to a wireless AP-FE #M 42M, a control unit 431, a communication NW 441, a control NW 442, and a wireless AP-BE #1 451, a wireless AP-BE #2 452 to a wireless AP-BE #N 45N (M and N are natural numbers of 2 or more). The communication network 200 communicates with the Internet 461. The control unit 431 has a database as shown in Table 1 of FIG. 12. That is, the database is described so that one wireless AP-BE (any of 451 to 45N) corresponds to one user of the wireless terminal 411.

The communication network 400 has a configuration in the case where a plurality of wireless AP-FEs and wireless AP-BEs are present, and one user is linked to one wireless AP-BE.

When the wireless terminal 411 starts communication within the communication area of the wireless AP-FE #2 422, terminal information is first transmitted from the control terminal 412 to the control unit 431 deployed in an upper network through a user operation using an application or the like. The terminal information includes information capable of identifying the terminal such as a MAC address of the wireless terminal 411 and current position information of the control terminal 412. Here, communication between the control terminal 412 and the control unit 431 may use a wired communication scheme such as Ethernet, or may use a wireless communication scheme such as licensed radio or unlicensed radio. Further, the wireless terminal 411 and the control terminal 412 may have a configuration in which the functions are separated as shown in FIG. 4, or may have an integrated configuration.

Upon receiving the terminal information transmitted from the control terminal 412, the control unit 431 performs, for example, collation with the database prepared in advance as shown in Table 1 of FIG. 12 based on the MAC address of the wireless terminal 411, and extracts the wireless AP-BE #1 451 linked to the user who owns the wireless terminal 411. Furthermore, the control unit 431 uses the position information of the wireless terminal 411 to extract the wireless AP-FE #2 422 close to the position where the wireless terminal 411 or the user is present. Specifically, it is sufficient for the control unit 431 to create in advance a database of information on the position where each wireless AP-FE is located (latitude and longitude information in the case of two dimensions, or latitude, longitude, and altitude information in the case of three dimensions), and search for the wireless AP-FE at the position that is closest to the position of the terminal.

After extracting the wireless AP-BE #1 451 and the wireless AP-FE #2 422, the control unit 431 transmits a control signal to the wireless AP-BE #1 451 and the wireless AP-FE #2 422 via the control NW 442. Here, it is assumed that the control signal includes, for example, the terminal information such as the MAC address of the wireless terminal 411 and connection information between the wireless AP-BE #1 451 and the wireless AP-FE #2 422. Further, the control unit 431 transmits a control signal to communication apparatuses constituting the communication NW 441 between the wireless AP-BE #1 451 and the wireless AP-FE #2 422 (communication NW). By changing the set values of the communication apparatuses based on the control signal, the communication NW 441 is made controllable by the control unit 431.

A signal transmitted from the wireless terminal 411 via radio waves is received by the wireless AP-FE #2 422, and transmitted to the wireless AP-BE #1 451 via the communication NW 441. Here, the wireless AP-FE #2 422 converts the received RF signal into an optical signal by E/O conversion, and transmits it to the wireless AP-BE #1 451. Further, the communication NW 441 is a network that transmits an RF signal as an optical signal, and may optically transmit a signal obtained by E/O-converting the carrier frequency used by the wireless terminal 411 as it is, or may optically transmit a signal obtained by E/O-converting an IF signal that is obtained by frequency conversion from the carrier frequency, and the frequency of the RF signal does not matter. In this way, a signal from the wireless terminal 411 is transmitted to the upper-level Internet 461 via the wireless AP-FE #2 422, the communication NW 441, and the wireless AP-BE #1 451.

On the other hand, a downlink signal is transmitted from the wireless AP-BE #1 451 to the wireless AP-FE #2 422 via the communication NW 441. In the wireless AP-FE #2 422, the signal is O/E-converted, and the signal after the O/E conversion is transmitted to the wireless terminal via radio waves.

As described above, deploying the wireless AP-FE #2 422 and the communication NW 441 capable of optically transmitting RF signals between the wireless terminal 411 and the wireless AP-BE #1 451 produces the same effect as an increase in the transmission distance of the wireless section between the wireless terminal and the wireless AP. As a result, it is sufficient that a radio signal processing unit supporting the wireless scheme of the wireless terminal 411 is deployed only in the wireless AP-BE #1 451, and it is not required for the wireless AP-FE #2 422. Accordingly, if the wireless AP-FE #2 422 that implements only relatively simple processing such as E/O conversion is present near the wireless terminal 411, it becomes possible for the wireless terminal 411 to be always connected to the private wireless AP-BE #1 451 at a remote location.

Fourth Embodiment

Figure 5:
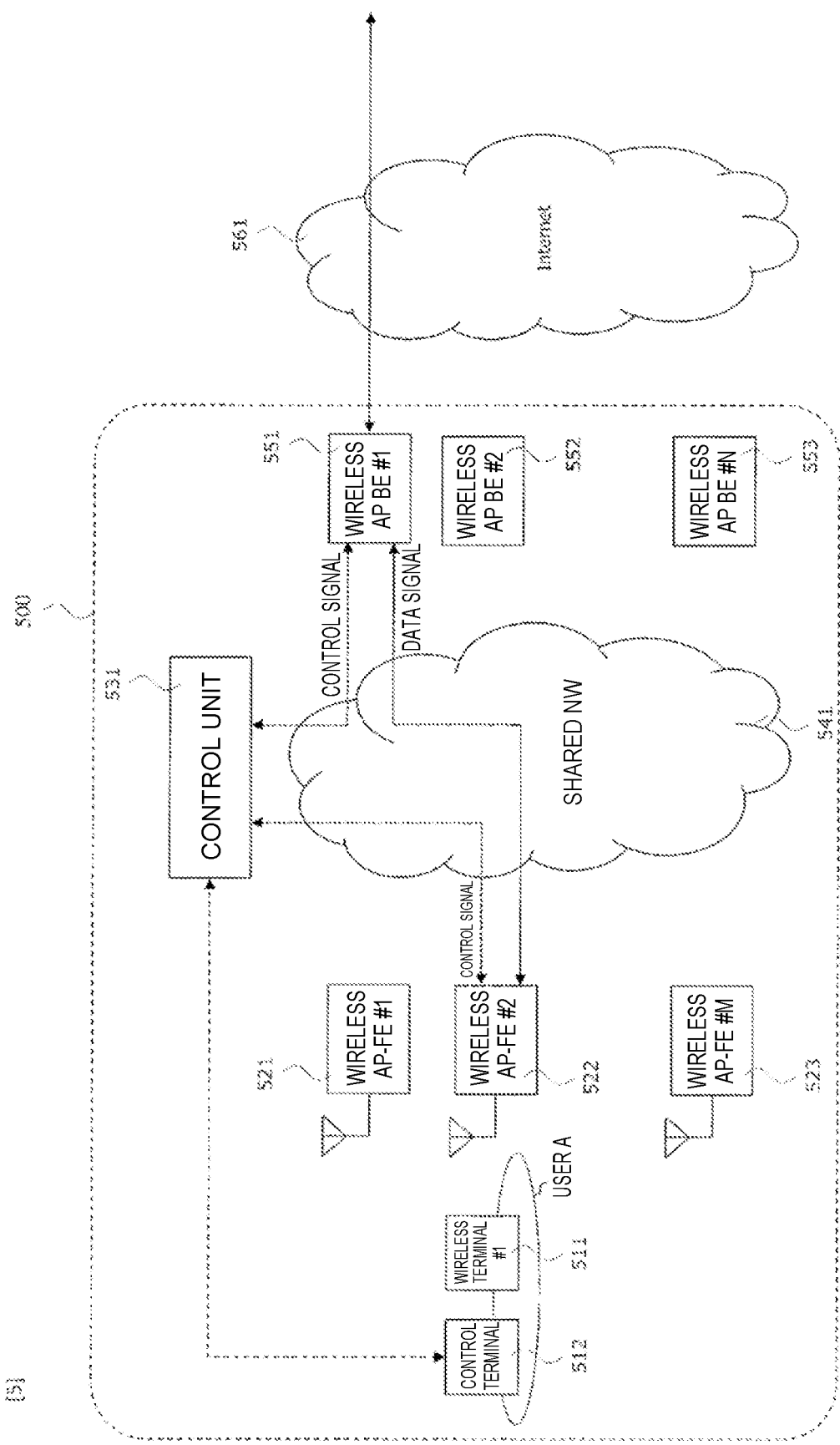
FIG. 5 is a diagram illustrating a communication system according to the present invention.

FIG. 5 is a diagram illustrating a communication system 500 of this embodiment. The communication network 500 includes a wireless terminal 511, a control terminal 512, a wireless AP-FE #1 521, a wireless AP-FE #2 522 to a wireless AP-FE #M 52M, a control unit 531, a shared NW 541, and a wireless AP-BE #1 551, a wireless AP-BE #2 552 to a wireless AP-BE #N 55N. The communication network 500 communicates with the Internet 561.

The communication network 500 has a configuration in the case where a plurality of wireless AP-FEs and wireless AP-BEs are present, and one user is linked to one wireless AP-BE.

When the wireless terminal 511 starts communication within the communication area of the wireless AP-FE #2 522, terminal information is first transmitted from the control terminal 512 to the control unit 531 deployed in an upper network through a user operation using an application or the like. The terminal information includes information capable of identifying the terminal such as a MAC address of the wireless terminal 511 and current position information of the control terminal 521. Here, communication between the control terminal 512 and the control unit 531 may use a wired communication scheme such as Ethernet, or may use a wireless communication scheme such as licensed radio or unlicensed radio. Further, the wireless terminal 511 and the control terminal 512 may have a configuration in which the functions are separated as shown in FIG. 5, or may have an integrated configuration.

Upon receiving the terminal information transmitted from the control terminal 512, the control unit 531 performs, for example, collation with the database prepared in advance as shown in Table 1 of FIG. 12 based on the MAC address of the wireless terminal 511, and extracts the wireless AP-BE #1 551 linked to the user who owns the wireless terminal 511. Furthermore, the control unit 531 uses the position information of the wireless terminal 511 to extract the wireless AP-FE #2 522 close to the position where the wireless terminal 511 or the user is present. Specifically, it is sufficient for the control unit 531 to create in advance a database of information on the position where each wireless AP-FE is located (latitude and longitude information in the case of two dimensions, or latitude, longitude, and altitude information in the case of three dimensions), and search for the wireless AP-FE at the position that is closest to the position of the terminal.

After extracting the wireless AP-BE #1 551 and the wireless AP-FE #2 522, the control unit 531 transmits a control signal to the wireless AP-BE #1 551 and the wireless AP-FE #2 522 via the shared NW 541. Here, it is assumed that the control signal includes, for example, the terminal information such as the MAC address of the wireless terminal 511 and connection information between the wireless AP-BE #1 551 and the wireless AP-FE #2 522. Further, the control unit 531 transmits a control signal to communication apparatuses constituting the communication NW 541 between the wireless AP-BE #1 551 and the wireless AP-FE #2 522 (communication NW). By changing the set values of the communication apparatuses based on the control signal, the communication NW 541 is made controllable by the control unit 531.

A signal transmitted from the wireless terminal 511 via radio waves is received by the wireless AP-FE #2 522, and transmitted to the wireless AP-BE #1 551 via the shared NW 542. Here, the wireless AP-FE #2 522 converts the received RF signal into an optical signal by E/O conversion, and transmits it to the wireless AP-BE #1 551. Further, the communication NW 541 is a network that transmits an RF signal as an optical signal, and may optically transmit a signal obtained by E/O-converting the carrier frequency used by the wireless terminal 511 as it is, or may optically transmit a signal obtained by E/O-converting an IF signal that is obtained by frequency conversion from the carrier frequency, and the frequency of the RF signal does not matter. In this way, a signal from the wireless terminal 511 is transmitted to the upper-level Internet 561 via the wireless AP-FE #2 522, the shared NW 541, and the wireless AP-BE #1 551.

On the other hand, a downlink signal is transmitted from the wireless AP-BE #1 551 to the wireless AP-FE #2 522 via the shared NW 541. In the wireless AP-FE #2 522, the signal is O/E-converted, and the signal after the O/E conversion is transmitted to the wireless terminal via radio waves.

As described above, deploying the wireless AP-FE #2 522 and the shared NW 541 capable of optically transmitting RF signals between the wireless terminal 511 and the wireless AP-BE #1 551 produces the same effect as an increase in the transmission distance of the wireless section between the wireless terminal and the wireless AP. As a result, it is sufficient that a radio signal processing unit supporting the wireless scheme of the wireless terminal 511 is deployed only in the wireless AP-BE #1 551, and it is not required for the wireless AP-FE #2 522. Accordingly, if the wireless AP-FE #2 522 that implements only relatively simple processing such as E/O conversion is present near the wireless terminal 511, it becomes possible for the wireless terminal 511 to be always connected to the private wireless AP-BE #1 551 at a remote location.

Fifth Embodiment

Figure 6:
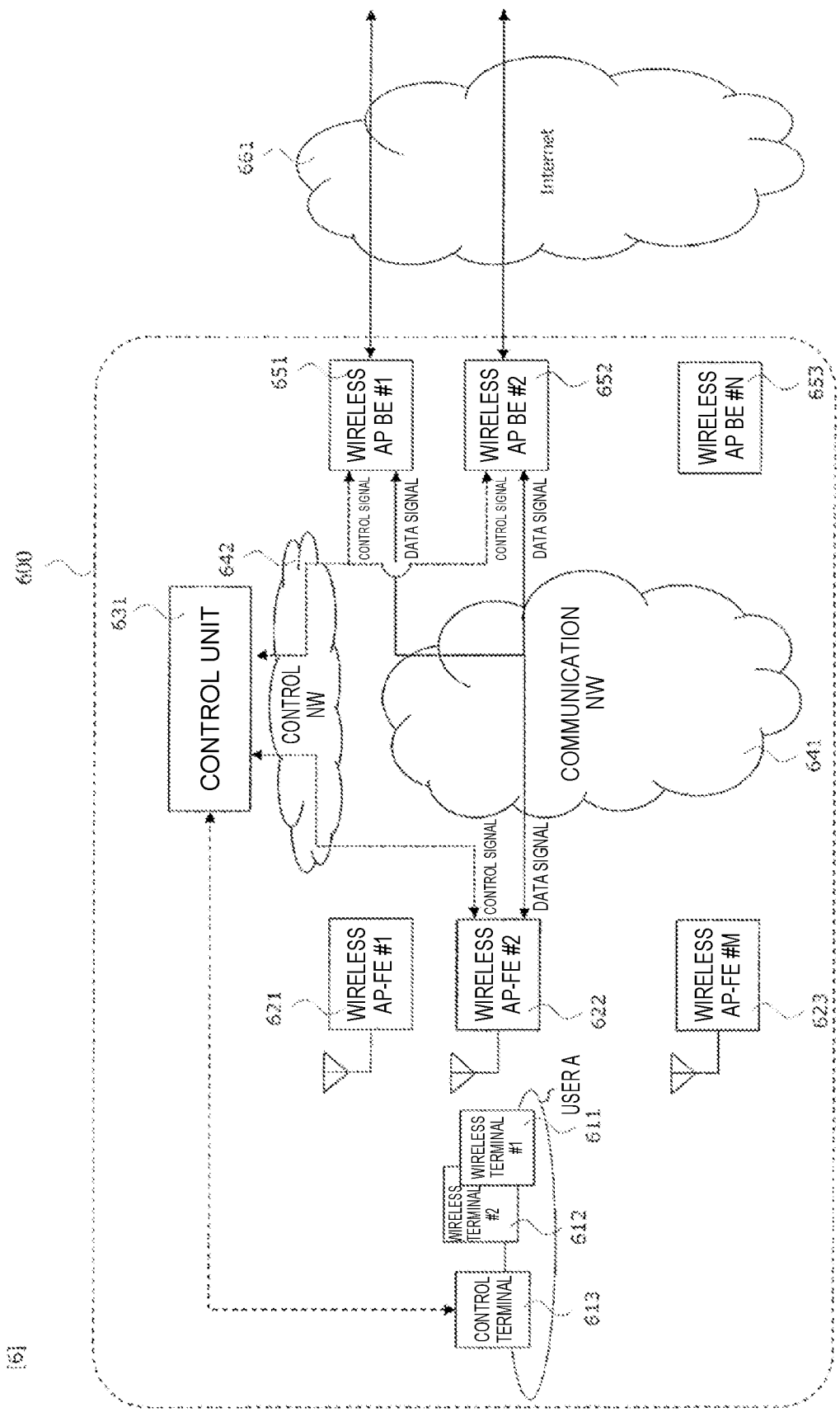
FIG. 6 is a diagram illustrating a communication system according to the present invention.

FIG. 6 is a diagram illustrating a communication system 600 of this embodiment. The communication network 600 includes a wireless terminal 611, a wireless terminal 612, a control terminal 613, a wireless AP-FE #1 621, a wireless AP-FE #2 622 to a wireless AP-FE #M 62M, a control unit 631, a communication NW 641, a control NW 642, and a wireless AP-BE #1 651, a wireless AP-BE #2 652 to a wireless AP-BE #N 65N. The communication network 600 communicates with the Internet 661. Note that it is assumed that communication schemes of the wireless terminal 611 (a wireless scheme A) and the wireless terminal 612 (a wireless scheme B) are different from each other.

The control unit 631 has a database as shown in Table 2 of FIG. 13. That is, the database is described so that one wireless AP-BE is associated with one user, and the wireless AP-BE is associated for each wireless scheme of the wireless terminal of the user.

The communication network 600 has a configuration in the case where a plurality of wireless AP-FEs and wireless AP-BEs are present, and the wireless AP-BEs are linked to the wireless terminals separately for each wireless scheme.

When the wireless terminal 611 and the wireless terminal 612 start communication within the communication area of the wireless AP-FE #2 622, terminal information is first transmitted from the control terminal 613 to the control unit 631 deployed in an upper network through a user operation using an application or the like. The terminal information includes the wireless schemes used by the wireless terminal 611 and the wireless terminal 612, information capable of identifying the terminals such as MAC addresses, and current position information of the control terminal 613. Here, communication between the control terminal 613 and the control unit 631 may use a wired communication scheme such as Ethernet, or may use a wireless communication scheme such as licensed radio or unlicensed radio. Further, the wireless terminal 611, the wireless terminal 612, and the control terminal 613 may have a configuration in which the functions are separated as shown in FIG. 6, or may have an integrated configuration.

Upon receiving the terminal information transmitted from the control terminal 613, the control unit 631 performs, for example, collation with the database prepared in advance as shown in Table 2 of FIG. 13 based on the MAC addresses of the wireless terminal 611 and the wireless terminal 612, and extracts the wireless AP-BE #1 651 linked to the wireless scheme A of the wireless terminal 611. In addition, the wireless AP-BE #2 652 linked to the wireless scheme B of the wireless terminal 612 is also extracted in the same manner. Furthermore, the control unit 631 uses the position information of the control terminal 613 to extract the wireless AP-FE #2 622 close to the position where the wireless terminal 611, the wireless terminal 612, or the user is present. Specifically, it is sufficient for the control unit 631 to create in advance a database of information on the position where each wireless AP-FE is located (latitude and longitude information in the case of two dimensions, or latitude, longitude, and altitude information in the case of three dimensions), and search for the wireless AP-FE at the position that is closest to the position of the terminal.

After extracting the wireless AP-BE #1 651, the wireless AP-BE #2 652, and the wireless AP-FE #2 622, the control unit 631 transmits a control signal to the wireless AP-BE #1 651, the wireless AP-BE #2 652, and the wireless AP-FE #2 622 via the control NW 642. Here, it is assumed that the control signal includes, for example, the terminal information such as the wireless schemes and the MAC addresses of the wireless terminal 611 and the wireless terminal 612, connection information between the wireless AP-BE #1 651 and the wireless AP-FE #2 622, and connection information between the wireless AP-BE #2 652 and the wireless AP-FE #2 622. Further, the control unit 631 transmits a control signal to communication apparatuses constituting the communication NW 641 between the wireless AP-BE #1 651 and the wireless AP-FE #2 622 and between the wireless AP-BE #2 652 and the wireless AP-FE #2 622. By changing the set values of the communication apparatuses based on the control signal, the communication NW 641 is made controllable by the control unit 631.

A signal transmitted from the wireless terminal 611 via radio waves is received by the wireless AP-FE #2 622, and transmitted to the wireless AP-BE #1 651 via the communication NW 641. On the other hand, a signal transmitted from the wireless terminal 612 via radio waves is received by the wireless AP-FE #2 622, and transmitted to the wireless AP-BE #2 652 via the communication NW 641. Here, the wireless AP-FE #2 622 converts the received RF signal into an optical signal by E/O conversion, and transmits it to the wireless AP-BE #1 651. Further, the communication NW 641 is a network that transmits RF signals as optical signals, and may optically transmit signals obtained by E/O-converting the carrier frequencies used by the wireless terminal 611 and the wireless terminal 612 as they are, or may optically transmit signals obtained by E/O-converting IF signals that are obtained by frequency conversion from the carrier frequencies, and the frequencies of the RF signals do not matter. In this way, a signal from the wireless terminal 611 or the wireless terminal 612 is transmitted to the upper-level Internet 661 via the wireless AP-FE #2 622, the communication NW 641, and the wireless AP-BE #1 651 or the wireless AP-BE #2 652.

A specific example of an uplink signal transmission method will be given. It is assumed that the wireless terminal 611 and the wireless terminal 612 transmit uplink signals by radio waves having different frequencies. The wireless AP-FE #2 622 converts these two received uplink signals into a Radio-over-Fiber signal without separating them, and transmits it to the communication NW 641. Note that the destination wireless AP-BEs have been given to the Radio-over-Fiber signal based on a control signal from the control unit 631. The communication NW 641 branches this Radio-over-Fiber signal into two signals, and inputs them to the wireless AP-BE #1 651 and the wireless AP-BE #2 652 for the users of the wireless terminal 611 and the wireless terminal 612. The wireless AP-BE #1 651 and the wireless AP-BE #2 652 each receive the Radio-over-Fiber signal still containing the two uplink signals, and after reception, frequency-separate the two uplink signals to obtain the desired signal. In this specific example, a case where the difference between the wireless schemes is the difference between the radio frequencies has been described. The difference between the wireless schemes may be not only the difference between the radio frequencies but also the difference between modulation schemes.

For example, the wireless AP-FE #2 622 can also convert uplink signals from the wireless terminal 611 and the wireless terminal 612 into optical signals having different wavelengths, and perform wavelength multiplexing for transmission to the communication NW 641 (hereinafter, this scheme will be referred to as "wavelength multiplexing scheme"). In this case, the wireless AP-BE #1 651 and the wireless AP-BE #2 652 have a demultiplexing function for separating the received wavelength-multiplexed optical signal into each wavelength.

Further, as another example, the communication NW 641 may have network equipment such as optical switches, and the control unit 631 may control the network equipment to transmit an optical signal between a desired wireless AP-FE and wireless AP-BE (hereinafter, this scheme will be referred to as "optical switch scheme").

On the other hand, a downlink signal is transmitted from the wireless AP-BE #1 651 or the wireless AP-BE #2 652 to the wireless AP-FE #2 622 via the communication NW 641. In the wireless AP-FE #2 622, the signal is O/E-converted, and the signal after the O/E conversion is transmitted to the wireless terminal via radio waves.

A specific example of a downlink signal transmission method will be given. The wireless AP-BE #1 651 and the wireless AP-BE #2 652 each receive a downlink signal from the Internet 661. The wireless AP-BE #1 651 and the wireless AP-BE #2 652 are given the destination wireless AP-FEs of the downlink signals based on a control signal from the control unit 631 (the wireless AP-BE #1 651 and the wireless AP-BE #2 652 may inquire of the control unit 631 about the destinations of the downlink signals). The wireless AP-BE #1 651 and the wireless AP-BE #2 652 convert the downlink signals into Radio-over-Fiber signals in consideration of the radio frequencies of the wireless terminal 611 and the wireless terminal 612, which are the destinations, attach the destinations thereto, and transmit them to the communication NW 641. The wireless AP-FE #2 622 receives the Radio-over-Fiber signals, converts them into radio downlink signals, and transmits them to the wireless terminal 611 and the wireless terminal 612. In this specific example, a case where the difference between the wireless schemes is the difference between the radio frequencies has been described. The difference between the wireless schemes may be not only the difference between the radio frequencies but also the difference between modulation schemes. For example, the wavelength multiplexing scheme and the optical switch scheme can also be applied to downlink signals as in the other examples described for uplink signals.

As described above, deploying the wireless AP-FE #2 622 and the communication NW 641 capable of optically transmitting RF signals between the wireless terminal 611 and the wireless AP-BE #1 651 and between the wireless terminal 612 and the wireless AP-BE #2 652 produces the same effect as an increase in the transmission distance of the wireless section between the wireless terminal and the wireless AP. As a result, it is sufficient that a radio signal processing unit supporting the wireless scheme of the wireless terminal 611 or the wireless terminal 612 is deployed only in the wireless AP-BE #1 651 or the wireless AP-BE #2 652, and it is not required for the wireless AP-FE #2 622. Accordingly, if the wireless AP-FE #2 622 that implements only relatively simple processing such as E/O conversion is present near the wireless terminal 611 and the wireless terminal 612, it becomes possible for the wireless terminal 611 and the wireless terminal 612 to be always connected to the private wireless AP-BE #1 651 and wireless AP-BE #2 652 at remote locations.

Sixth Embodiment

Figure 7:
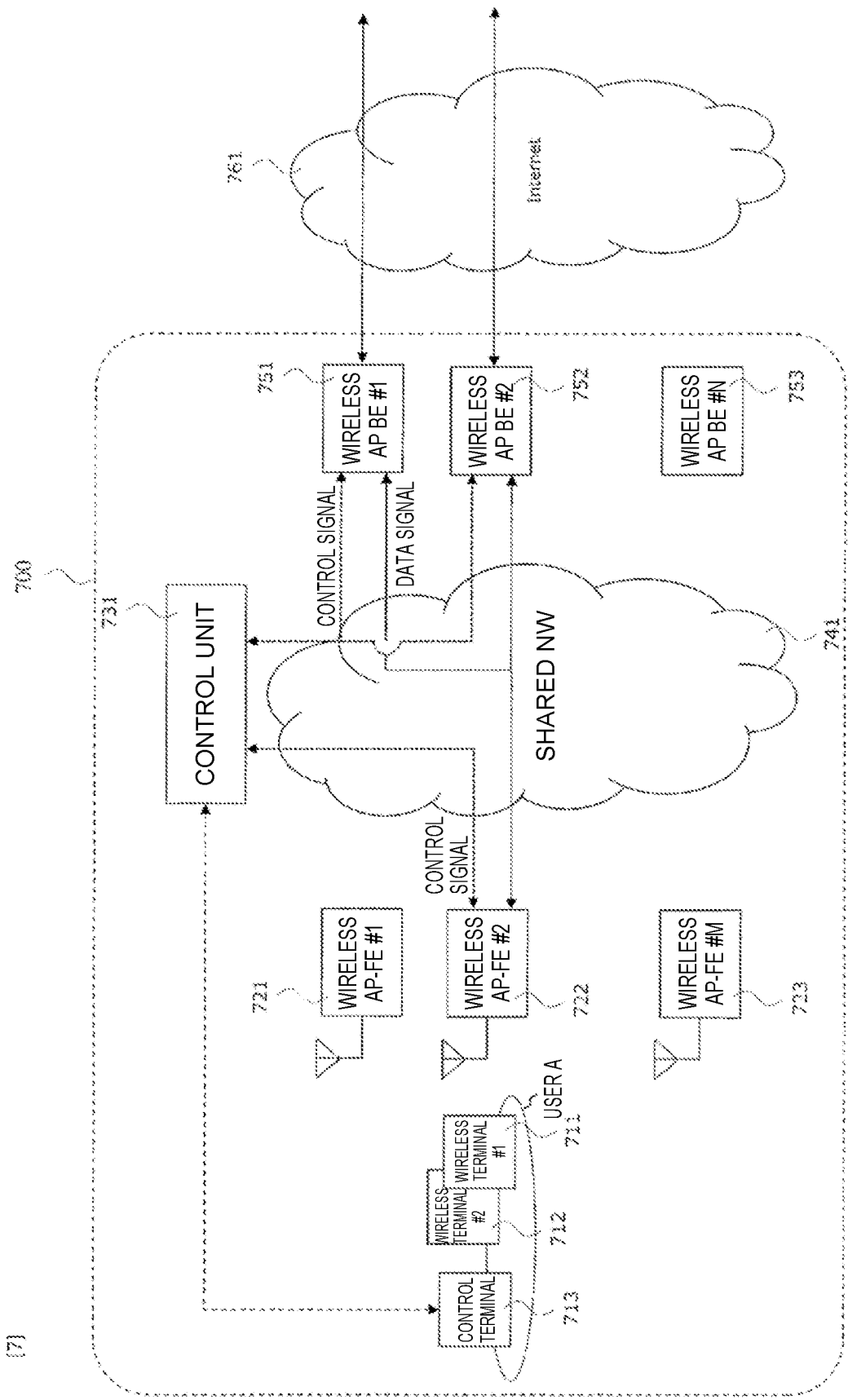
FIG. 7 is a diagram illustrating a communication system according to the present invention.

FIG. 7 is a diagram illustrating a communication system 700 of this embodiment. The communication network 700 includes a wireless terminal 711, a wireless terminal 712, a control terminal 713, a wireless AP-FE #1 721, a wireless AP-FE #2 722 to a wireless AP-FE #M 72M, a control unit 731, a shared NW 741, and a wireless AP-BE #1 751, a wireless AP-BE #2 752 to a wireless AP-BE #N 75N. The communication network 700 communicates with the Internet 761. Note that it is assumed that communication schemes of the wireless terminal 711 (a wireless scheme A) and the wireless terminal 712 (a wireless scheme B) are different from each other.

The control unit 731 has a database as shown in Table 2 of FIG. 13. That is, the database is described so that one wireless AP-BE is associated with one user, and the wireless AP-BE is associated for each wireless scheme of the wireless terminal of the user.

The communication network 700 has a configuration in the case where a plurality of wireless AP-FEs and wireless AP-BEs are present, and the wireless AP-BEs are linked to the wireless terminals separately for each wireless scheme.

When the wireless terminal 711 and the wireless terminal 712 start communication within the communication area of the wireless AP-FE #2 722, terminal information is first transmitted from the control terminal 713 to the control unit 731 deployed in an upper network through a user operation using an application or the like. The terminal information includes the wireless schemes used by the wireless terminal 711 and the wireless terminal 712, information capable of identifying the terminals such as MAC addresses, and current position information of the control terminal 713. Here, communication between the control terminal 713 and the control unit 731 may use a wired communication scheme such as Ethernet, or may use a wireless communication scheme such as licensed radio or unlicensed radio. Further, the wireless terminal 711, the wireless terminal 712, and the control terminal 713 may have a configuration in which the functions are separated as shown in FIG. 7, or may have an integrated configuration.

Upon receiving the terminal information transmitted from the control terminal 713, the control unit 731 performs, for example, collation with the database prepared in advance as shown in Table 2 based on the MAC addresses of the wireless terminal 711 and the wireless terminal 712, and extracts the wireless AP-BE #1 751 linked to the wireless scheme A of the wireless terminal 711. In addition, the wireless AP-BE #2 752 linked to the wireless scheme B of the wireless terminal 712 is also extracted in the same manner. Furthermore, the control unit 731 uses the position information of the control terminal 713 to extract the wireless AP-FE #2 722 close to the position where the wireless terminal 711, the wireless terminal 712, or the user is present. Specifically, it is sufficient for the control unit 731 to create in advance a database of information on the position where each wireless AP-FE is located (latitude and longitude information in the case of two dimensions, or latitude, longitude, and altitude information in the case of three dimensions), and search for the wireless AP-FE at the position that is closest to the position of the terminal.

After extracting the wireless AP-BE #1 751, the wireless AP-BE #2 752, and the wireless AP-FE #2 722, the control unit 731 transmits a control signal to the wireless AP-BE #1 751, the wireless AP-BE #1 752, and the wireless AP-FE #2 722 via the shared NW 741. Here, it is assumed that the control signal includes, for example, the terminal information such as the wireless schemes and the MAC addresses of the wireless terminal 711 and the wireless terminal 712, connection information between the wireless AP-BE #1 751 and the wireless AP-FE #2 722, and connection information between the wireless AP-BE #1 752 and the wireless AP-FE #2 752. Further, the control unit 731 transmits a control signal to communication apparatuses constituting the shared NW 741 between the wireless AP-BE #1 751 and the wireless AP-FE #2 722 and between the wireless AP-BE #1 752 and the wireless AP-FE #2 722. By changing the set values of the communication apparatuses based on the control signal, the shared NW 741 is made controllable by the control unit 731.

A signal transmitted from the wireless terminal 711 via radio waves is received by the wireless AP-FE #2 722, and transmitted to the wireless AP-BE #1 751 via the shared NW 741. On the other hand, a signal transmitted from the wireless terminal 712 via radio waves is received by the wireless AP-FE #2 722, and transmitted to the wireless AP-BE #2 752 via the shared NW 741. Here, the wireless AP-FE #2 722 converts the received RF signal into an optical signal by E/O conversion, and transmits it to the wireless AP-BE #1 651. Further, the shared NW 741 is a network that transmits RF signals as optical signals, and may optically transmit signals obtained by E/O-converting the carrier frequencies used by the wireless terminal 711 and the wireless terminal 712 as they are, or may optically transmit signals obtained by E/O-converting IF signals that are obtained by frequency conversion from the carrier frequencies, and the frequencies of the RF signals do not matter. In this way, a signal from the wireless terminal 711 or the wireless terminal 712 is transmitted to the upper-level Internet 761 via the wireless AP-FE #2 722, the shared NW 741, and the wireless AP-BE #1 751 or the wireless AP-BE #2 752.

A specific example of an uplink signal transmission method will be given. It is assumed that the wireless terminal 711 and the wireless terminal 712 transmit uplink signals by radio waves having different frequencies. The wireless AP-FE #2 722 converts these two received uplink signals into a Radio-over-Fiber signal without separating them, and transmits it to the shared NW 741. Note that the destination wireless AP-BEs have been given to the Radio-over-Fiber signal based on a control signal from the control unit 731. The shared NW 741 branches this Radio-over-Fiber signal into two signals, and inputs them to the wireless AP-BE #1 751 and the wireless AP-BE #2 752 for the users of the wireless terminal 711 and the wireless terminal 712. The wireless AP-BE #1 751 and the wireless AP-BE #2 752 each receive the Radio-over-Fiber signal still containing the two uplink signals, and after reception, frequency-separate the two uplink signals to obtain the desired signal. In this specific example, a case where the difference between the wireless schemes is the difference between the radio frequencies has been described. The difference between the wireless schemes may be not only the difference between the radio frequencies but also the difference between modulation schemes. For example, the wavelength multiplexing scheme and the optical switch scheme can be applied.

On the other hand, a downlink signal is transmitted from the wireless AP-BE #1 751 or the wireless AP-BE #2 752 to the wireless AP-FE #2 722 via the shared NW 741. In the wireless AP-FE #2 722, the signal is O/E-converted, and the signal after the O/E conversion is transmitted to the wireless terminal via radio waves.

A specific example of a downlink signal transmission method will be given. The wireless AP-BE #1 751 and the wireless AP-BE #2 752 each receive a downlink signal from the Internet 761. The wireless AP-BE #1 751 and the wireless AP-BE #2 752 are given the destination wireless AP-FEs of the downlink signals based on a control signal from the control unit 731 (the wireless AP-BE #1 751 and the wireless AP-BE #2 752 may inquire of the control unit 731 about the destinations of the downlink signals). The wireless AP-BE #1 751 and the wireless AP-BE #2 752 convert the downlink signals into RF signals having different frequencies in consideration of the radio frequencies of the wireless terminal 711 and the wireless terminal 712, which are the destinations, multiplex them, convert the resultant signal into a Radio-over-Fiber signal, attach the destinations thereto, and transmit it to the communication NW 741. The wireless AP-FE #2 722 receives the Radio-over-Fiber signal, converts it into radio downlink signals, and transmits them to the wireless terminal 711 and the wireless terminal 712. In this specific example, a case where the difference between the wireless schemes is the difference between the radio frequencies has been described. The difference between the wireless schemes may be not only the difference between the radio frequencies but also the difference between modulation schemes. For example, the wavelength multiplexing scheme and the optical switch scheme can also be applied to downlink signals as in the other examples described for uplink signals.

As described above, deploying the wireless AP-FE #2 722 and the shared NW 741 capable of optically transmitting RF signals between the wireless terminal 711 and the wireless AP-BE #1 751 and between the wireless terminal 712 and the wireless AP-BE #2 752 produces the same effect as an increase in the transmission distance of the wireless section between the wireless terminal and the wireless AP. As a result, it is sufficient that a radio signal processing unit supporting the wireless scheme of the wireless terminal 711 or the wireless terminal 712 is deployed only in the wireless AP-BE #1 751 or the wireless AP-BE #2 752, and it is not required for the wireless AP-FE #2 722. Accordingly, if the wireless AP-FE #2 722 that implements only relatively simple processing such as E/O conversion is present near the wireless terminal 711 and the wireless terminal 712, it becomes possible for the wireless terminal 711 and the wireless terminal 712 to be always connected to the private wireless AP-BE #1 751 and wireless AP-BE #2 652 at remote locations.

Seventh Embodiment

Figure 8:
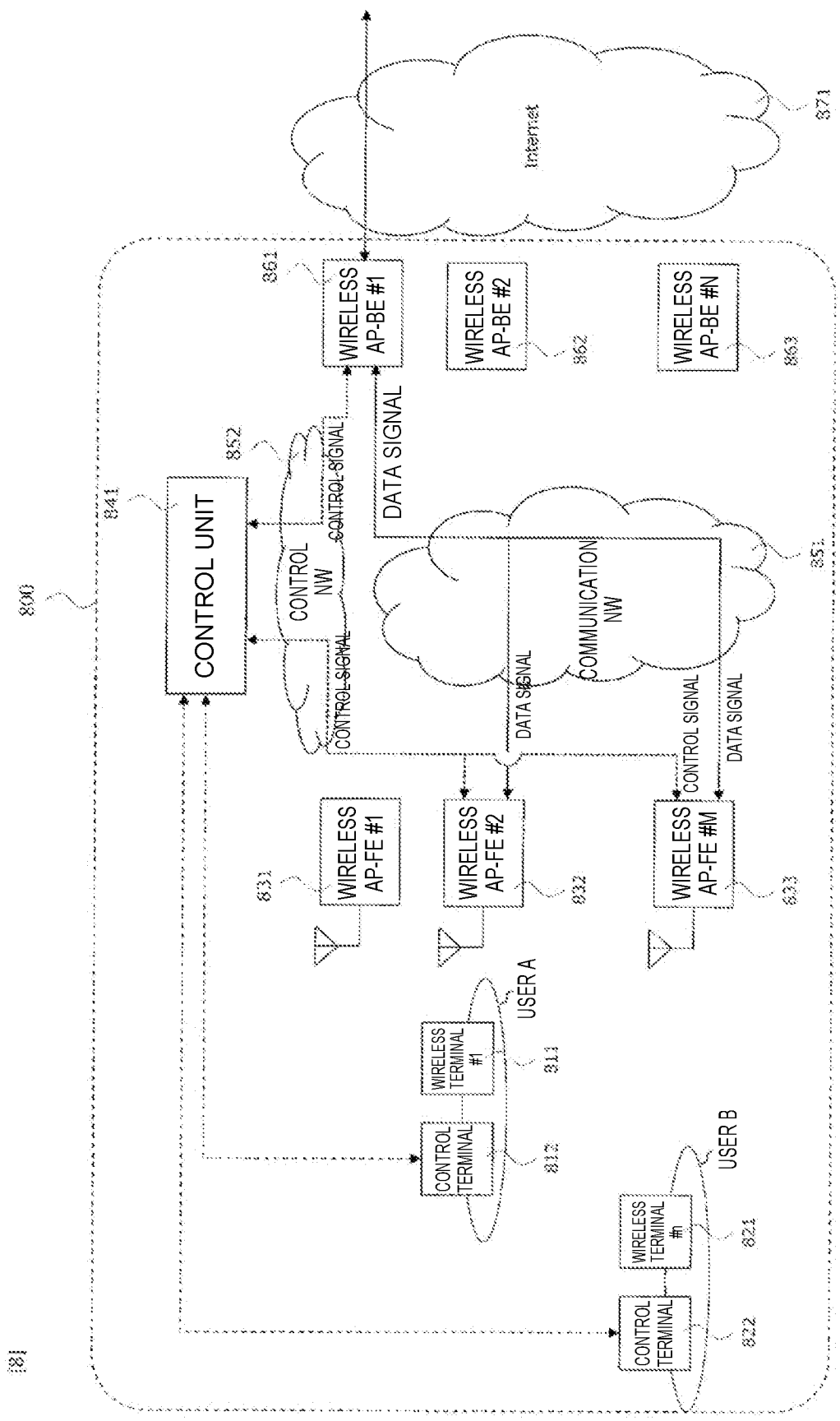
FIG. 8 is a diagram illustrating a communication system according to the present invention.

FIG. 8 is a diagram illustrating a communication system 800 of this embodiment. The communication network 800 includes a wireless terminal 811, its control terminal 812, a wireless terminal 821, its control terminal 822, a wireless AP-FE #2 831, a wireless AP-FE #2 832 to a wireless AP-FE #M 83M, a control unit 841, a communication NW 852, a control NW 851, and a wireless AP-BE #1 861, a wireless AP-BE #2 862 to a wireless AP-BE #N 86N. The communication network 800 communicates with the Internet 871.

The communication system 800 has a configuration in which one wireless AP-BE is shared by a plurality of users (the wireless terminals 811 and 821). In this configuration, even while the users (the wireless terminals 811 and 821) are in different areas, they can access a common wireless AP-BE from their respective areas via nearby wireless AP-FEs. The control unit 841 has a database as shown in Table 3 of FIG. 14. That is, the database is described so that one wireless AP-BE corresponds to a plurality of users of the wireless terminals.

When the wireless terminal #1 811 and the wireless terminal #n 821 start communication within the communication areas of the wireless AP-FE #2 832 and the wireless AP-FE #M 83M, respectively, their respective pieces of terminal information are first transmitted from the control terminal 812 and the control terminal 822 to the control unit 841 deployed in an upper network through a user operation using an application or the like. The terminal information includes information capable of identifying the terminals such as MAC addresses of the wireless terminal 811 and the wireless terminal 821, and current position information of the control terminal 812 and the control terminal 822. Here, communication between the control terminal 812 and the control unit 841 and between the control terminal 822 and the control unit 841 may use a wired communication scheme such as Ethernet, or may use a wireless communication scheme such as licensed radio or unlicensed radio. Further, the wireless terminal 811 and the control terminal 812 as well as the wireless terminal 821 and the control terminal 822 may have a configuration in which the functions are separated as shown in FIG. 8, or may have an integrated configuration.

Upon receiving the terminal information transmitted from the control terminal 812 and the control terminal 822, the control unit 841 performs, for example, collation with the database prepared in advance as shown in Table 3 based on the MAC addresses of the wireless terminal 811 and the control terminal 822, and extracts the wireless AP-BE #1 861 linked to the users who own the wireless terminal 811 and the wireless terminal 822. Furthermore, the control unit 841 uses the position information of the control terminal 812 and the control terminal 822 to extract wireless AP-FEs that are present at positions close to the control terminals.

Specifically, it is sufficient for the control unit 841 to create in advance a database of information on the position where each wireless AP-FE is located (latitude and longitude information in the case of two dimensions, or latitude, longitude, and altitude information in the case of three dimensions), and search for the wireless AP-FE at the position that is closest to the position of the terminal.

The wireless AP-FE #2 832 and the wireless AP-FE #M 83M are assigned to the wireless terminal 811 and the wireless terminal 821, respectively, as the connection destination wireless AP-FEs. When the wireless AP-FEs and the wireless AP-BE which are to be connected are extracted, the control unit 841 transmits a control signal to the wireless AP-BE #1 861, the wireless AP-FE #2 832, and the wireless AP-FE #M 83M via the control NW 852. Here, it is assumed that the control signal includes, for example, the terminal information such as the MAC addresses of the wireless terminal 811 and the wireless terminal 822, connection information among the wireless AP-BE #1 861, the wireless AP-FE #2 832, and the wireless AP-FE #M 83M. Further, the control unit 841 transmits a control signal to communication apparatuses constituting the communication NW 851 between the wireless AP-BE #1 861 and the wireless AP-FE #2 832 and between the wireless AP-BE #1 861 and the wireless AP-FE #M 83M. By changing the set values of the communication apparatuses based on the control signal, the communication NW 851 is made controllable by the control unit 841.

Signals transmitted from the wireless terminal 811 and the wireless terminal 821 via radio waves are received by the wireless AP-FE #2 832 and the wireless AP-FE #M 83M, respectively, and transmitted to the wireless AP-BE #1 861 via the communication NW 851. Here, the wireless AP-FE #2 832 and the wireless AP-FE #M 83M convert the received RF signals into optical signals by E/O conversion, and transmit them to the wireless AP-BE #1 861. Further, the communication NW 851 is a network that transmits RF signals as optical signals, and may optically transmit signals obtained by E/O-converting the carrier frequencies used by the wireless terminal 811 and the wireless terminal 821 as they are, or may optically transmit signals obtained by E/O-converting IF signals that are obtained by frequency conversion from the carrier frequencies, and the frequencies of the RF signals do not matter. In this way, signals from the wireless terminal 811 and the wireless terminal 821 are transmitted to the upper-level Internet 871 via the wireless AP-FE #2 832 and the wireless AP-FE #M 83M, the communication NW 851, and the wireless AP-BE #1 861.

A specific example of an uplink signal transmission method will be given. It is assumed that the wireless terminal 811 and the wireless terminal 821 transmit uplink signals by radio waves having different frequencies. The wireless AP-FE #2 832 and the wireless AP-FE #M 83M convert their respective received uplink signals into Radio-over-Fiber signals, and transmit them to the communication NW 851. Note that the destination wireless AP-BE has been given to the Radio-over-Fiber signals based on a control signal from the control unit 631. The communication NW 851 inputs these Radio-over-Fiber signals to the wireless AP-BE #1 861 for the users of the wireless terminal 811 and the wireless terminal 821. The wireless AP-BE #1 861 receives the two Radio-over-Fiber signals, and after reception, frequency-separates the two uplink signals to obtain the desired signals. In this specific example, a case where the difference between the wireless schemes is the difference between the radio frequencies has been described. The difference between the wireless schemes may be not only the difference between the radio frequencies but also the difference between modulation schemes. For example, the wavelength multiplexing scheme and the optical switch scheme can be applied.

On the other hand, downlink signals are transmitted from the wireless AP-BE #1 861 to the wireless AP-FE #2 832 and the wireless AP-FE #M 83M via the communication NW 851. In the wireless AP-FE #2 832 and the wireless AP-FE #M 83M, the signals are O/E-converted, and the signals after the O/E conversion are transmitted to the wireless terminals via radio waves.

A specific example of a downlink signal transmission method will be given. The wireless AP-BE #1 861 receives two downlink signals from the Internet 661. The wireless AP-BE #1 861 is given the destination wireless AP-FEs of the two downlink signals based on a control signal from the control unit 841 (the wireless AP-BE #1 861 may inquire of the control unit 841 about the destinations of the downlink signals). The wireless AP-BE #1 861 converts the two downlink signals into RF signals having different frequencies in consideration of the radio frequencies of the wireless terminal 811 and the wireless terminal 812, which are the destinations, multiplexes them, converts the resultant signal into a Radio-over-Fiber signal, attaches the destinations thereto, and transmits it to the communication NW 851. The communication NW 851 branches this Radio-over-Fiber signal into two signals, and inputs them to the wireless AP-FE #2 832 and the wireless AP-FE #M 83M. The wireless AP-FE #2 832 and the wireless AP-FE #M 83M receive the Radio-over-Fiber signal, and convert it into radio downlink signals having the different frequencies. Then, the wireless AP-FE #2 832 and the wireless AP-FE #M 83M transmit these two radio downlink signals toward their own areas. The wireless terminal 811 and the wireless terminal 821 each receive the radio signal having the receivable frequency. In this specific example, a case where the difference between the wireless schemes is the difference between the radio frequencies has been described. The difference between the wireless schemes may be not only the difference between the radio frequencies but also the difference between modulation schemes. For example, the wavelength multiplexing scheme and the optical switch scheme can also be applied to downlink signals as in the other examples described for uplink signals.

As described above, deploying the wireless AP-FE #2 832 and the wireless AP-FE #M 83M and the communication NW 851 capable of optically transmitting RF signals among the wireless terminal 811, the wireless terminal 821, and the wireless AP-BE #1 861 produces the same effect as an increase in the transmission distance of the wireless section between the wireless terminal and the wireless AP. As a result, it is sufficient that a radio signal processing unit supporting the wireless scheme of the wireless terminal 811 and the wireless terminal 821 is deployed only in the wireless AP-BE #1 861, and it is not required for the wireless AP-FE #2 832 between the wireless terminals and the wireless AP-BE #1 861. Accordingly, if the wireless AP-FE #2 832 and the wireless AP-FE #M 83M that implement only relatively simple processing such as E/O conversion are present near the wireless terminal 811 and the wireless terminal 821, it becomes possible for the wireless terminal 811 and the wireless terminal 821 to be always connected to the private wireless AP-BE #1 861 at a remote location.

Eighth Embodiment

Figure 9:
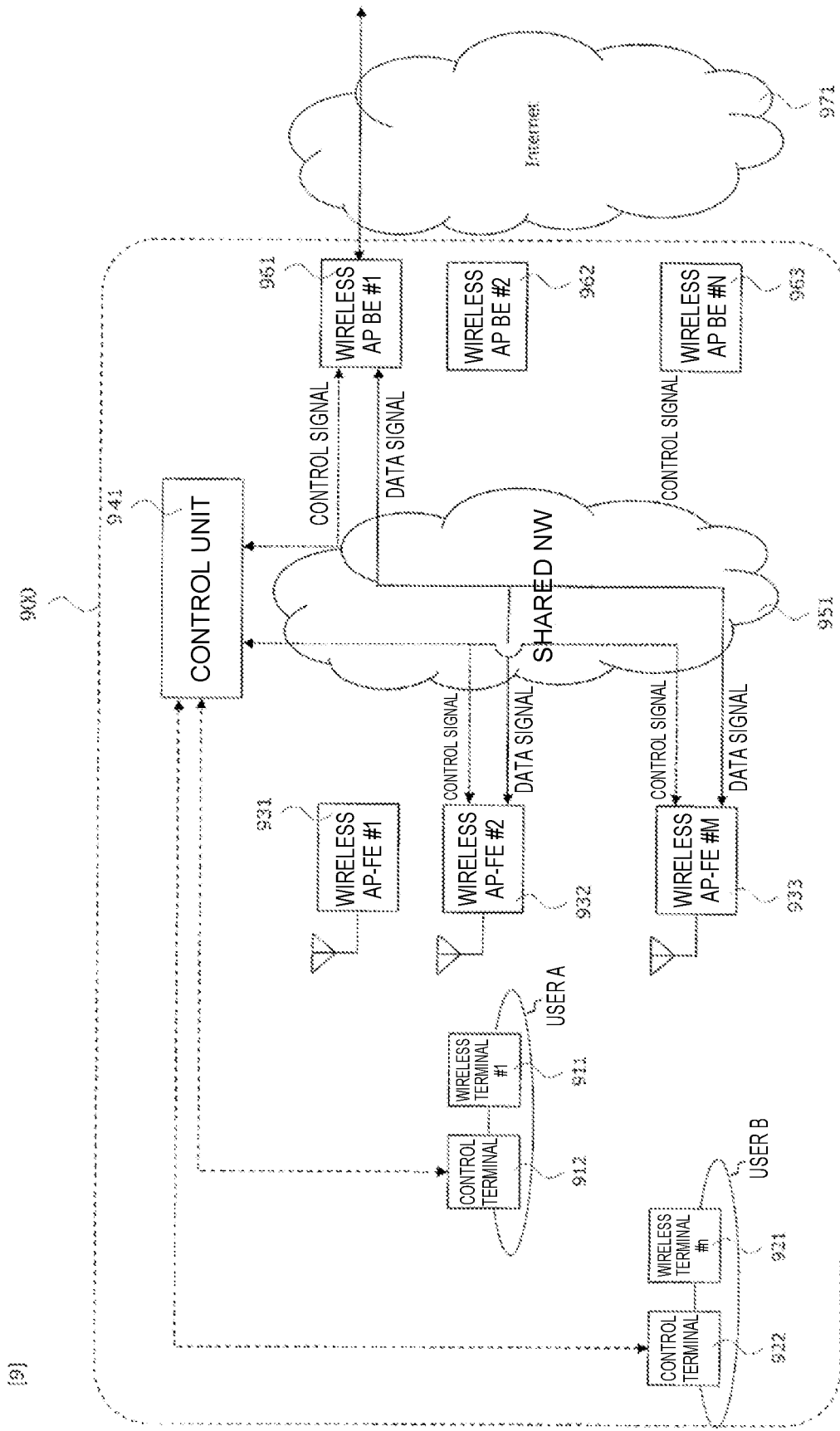
FIG. 9 is a diagram illustrating a communication system according to the present invention.

FIG. 9 is a diagram illustrating a communication system 900 of this embodiment. The communication network 900 includes a wireless terminal 911, its control terminal 912, a wireless terminal 921, its control terminal 922, a wireless AP-FE #2 931, a wireless AP-FE #2 932 to a wireless AP-FE #M 93M, a control unit 941, a shared NW 951, and a wireless AP-BE #1 961, a wireless AP-BE #2 962 to a wireless AP-BE #N 96N. The communication network 900 communicates with the Internet 971.

The communication system 900 shows a configuration in which one wireless AP-BE is shared by a plurality of users (the control terminals 912 and 922). In this configuration, even while the users (the control terminals 912 and 922) are in different areas, they can access a common wireless AP-BE from their respective areas via nearby wireless AP-FEs. The control unit 941 has a database as shown in Table 3 of FIG. 14. That is, the database is described so that one wireless AP-BE corresponds to a plurality of users of the wireless terminals. As compared to the communication system 800 in FIG. 8, the communication system 900 has a configuration in which a control signal is transmitted/received and a data signal is transmitted/received by the shared NW 951 which is a combination of the control NW 852 and the communication NW 851.

When the wireless terminal #1 911 and the wireless terminal #n 921 start communication within the communication areas of the wireless AP-FE #2 932 and the wireless AP-FE #3 933, respectively, their respective pieces of terminal information are first transmitted from the control terminal 912 and the control terminal 922 to the control unit 941 deployed in an upper network through a user operation using an application or the like. The terminal information includes information capable of identifying the terminals such as MAC addresses of the wireless terminal 911 and the wireless terminal 921, and current position information of the control terminal 912 and the control terminal 922. Here, communication between the control terminal 912 and the control unit 941 and between the control terminal 922 and the control unit 941 may use a wired communication scheme such as Ethernet, or may use a wireless communication scheme such as licensed radio or unlicensed radio. Further, the wireless terminal 911 and the control terminal 912 as well as the wireless terminal 921 and the control terminal 922 may have a configuration in which the functions are separated as shown in FIG. 9, or may have an integrated configuration.

Upon receiving the terminal information transmitted from the control terminal 912 and the control terminal 922, the control unit 941 performs, for example, collation with the database prepared in advance as shown in Table 3 based on the MAC addresses of the wireless terminal 911 and the control terminal 922, and extracts the wireless AP-BE #1 961 linked to the users who own the wireless terminal 911 and the wireless terminal 922. Furthermore, the control unit 941 uses the position information of the control terminal 912 and the control terminal 922 to extract wireless AP-FEs that are present at positions close to the control terminals. Specifically, it is sufficient for the control unit 941 to create in advance a database of information on the position where each wireless AP-FE is located (latitude and longitude information in the case of two dimensions, or latitude, longitude, and altitude information in the case of three dimensions), and search for the wireless AP-FE at the position that is closest to the position of the terminal.

The wireless AP-FE #2 932 and the wireless AP-FE #M 93M are assigned to the wireless terminal 911 and the wireless terminal 921, respectively, as the connection destination wireless AP-FEs. When the wireless AP-FEs and the wireless AP-BE which are to be connected are extracted, the control unit 941 transmits a control signal to the wireless AP-BE #1 961, the wireless AP-FE #2 932, and the wireless AP-FE #M 93M via the shared NW 951. Here, it is assumed that the control signal includes, for example, the terminal information such as the MAC addresses of the wireless terminal 911 and the wireless terminal 922, connection information among the wireless AP-BE #1 961, the wireless AP-FE #2 962, and the wireless AP-FE #M 96M. Further, the control unit 941 transmits a control signal to communication apparatuses constituting the communication NW 951 between the wireless AP-BE #1 961 and the wireless AP-FE #2 932 and between the wireless AP-BE #1 961 and the wireless AP-FE #M 93M. By changing the set values of the communication apparatuses based on the control signal, the communication NW 951 is made controllable by the control unit 941.

Signals transmitted from the wireless terminal 911 and the wireless terminal 921 via radio waves are received by the wireless AP-FE #2 932 and the wireless AP-FE #M 93M, respectively, and transmitted to the wireless AP-BE #1 961 via the communication NW 951. Here, the wireless AP-FE #2 932 and the wireless AP-FE #M 93M convert the received RF signals into optical signals by E/O conversion, and transmit them to the wireless AP-BE #1 961. Further, the shared NW 961 is a network that transmits RF signals as optical signals, and may optically transmit signals obtained by E/O-converting the carrier frequencies used by the wireless terminal 911 and the wireless terminal 921 as they are, or may optically transmit signals obtained by E/O-converting IF signals that are obtained by frequency conversion from the carrier frequencies, and the frequencies of the RF signals do not matter. In this way, signals from the wireless terminal 911 and the wireless terminal 921 are transmitted to the upper-level Internet 971 via the wireless AP-FE #2 932 and the wireless AP-FE #M 93M, the shared NW 961, and the wireless AP-BE #1 961.

A specific example of an uplink signal transmission method will be given. It is assumed that the wireless terminal 911 and the wireless terminal 921 transmit uplink signals by radio waves having different frequencies. The wireless AP-FE #2 932 and the wireless AP-FE #M 93M convert their respective received uplink signals into Radio-over-Fiber signals, and transmit them to the shared NW 951. Note that the destination wireless AP-BE has been given to the Radio-over-Fiber signals based on a control signal from the control unit 631. The shared NW 951 inputs these Radio-over-Fiber signals to the wireless AP-BE #1 961 for the users of the wireless terminal 911 and the wireless terminal 921. The wireless AP-BE #1 961 receives the two Radio-over-Fiber signals, and after reception, frequency-separates the two uplink signals to obtain the desired signals. In this specific example, a case where the difference between the wireless schemes is the difference between the radio frequencies has been described. The difference between the wireless schemes may be not only the difference between the radio frequencies but also the difference between modulation schemes. For example, the wavelength multiplexing scheme and the optical switch scheme can be applied.

On the other hand, downlink signals are transmitted from the wireless AP-BE #1 961 to the wireless AP-FE #2 932 and the wireless AP-FE #M 93M via the shared NW 951. In the wireless AP-FE #2 932 and the wireless AP-FE #M 93M, the signals are O/E-converted, and the signals after the O/E conversion are transmitted to the wireless terminals via radio waves.

A specific example of a downlink signal transmission method will be given. The wireless AP-BE #1 961 receives two downlink signals from the Internet 661. The wireless AP-BE #1 961 is given the destination wireless AP-FEs of the two downlink signals based on a control signal from the control unit 941 (the wireless AP-BE #1 961 may inquire of the control unit 941 about the destinations of the downlink signals). The wireless AP-BE #1 961 converts the two downlink signals into RF signals having different frequencies in consideration of the radio frequencies of the wireless terminal 911 and the wireless terminal 921, which are the destinations, multiplexes them, converts the resultant signal into a Radio-over-Fiber signal, attaches the destinations thereto, and transmits it to the shared NW 951. The shared NW 951 branches this Radio-over-Fiber signal into two signals, and inputs them to the wireless AP-FE #2 932 and the wireless AP-FE #M 93M. The wireless AP-FE #2 932 and the wireless AP-FE #M 93M receive the Radio-over-Fiber signal, and convert it into radio downlink signals having the different frequencies. Then, the wireless AP-FE #2 932 and the wireless AP-FE #M 93M transmit these two radio downlink signals toward their own areas. The wireless terminal 911 and the wireless terminal 921 each receive the radio signal having the receivable frequency. In this specific example, a case where the difference between the wireless schemes is the difference between the radio frequencies has been described. The difference between the wireless schemes may be not only the difference between the radio frequencies but also the difference between modulation schemes. For example, the wavelength multiplexing scheme and the optical switch scheme can also be applied to downlink signals as in the other examples described for uplink signals.

As described above, deploying the wireless AP-FE #2 932 and the wireless AP-FE #M 93M and the shared NW 951 capable of optically transmitting RF signals among the wireless terminal 911, the wireless terminal 921, and the wireless AP-BE #1 961 produces the same effect as an increase in the transmission distance of the wireless section between the wireless terminal and the wireless AP. As a result, it is sufficient that a radio signal processing unit supporting the wireless scheme of the wireless terminal 911 and the wireless terminal 921 is deployed only in the wireless AP-BE #1 961, and it is not required for the wireless AP-FE #2 932 between the wireless terminals and the wireless AP-BE #1 961. Accordingly, if the wireless AP-FE #2 932 and the wireless AP-FE #M 93M that implement only relatively simple processing such as E/O conversion are present near the wireless terminal 911 and the wireless terminal 921, it becomes possible for the wireless terminal 911 and the wireless terminal 921 to be always connected to the private wireless AP-BE #1 961 at a remote location.

Ninth Embodiment

Figure 10:
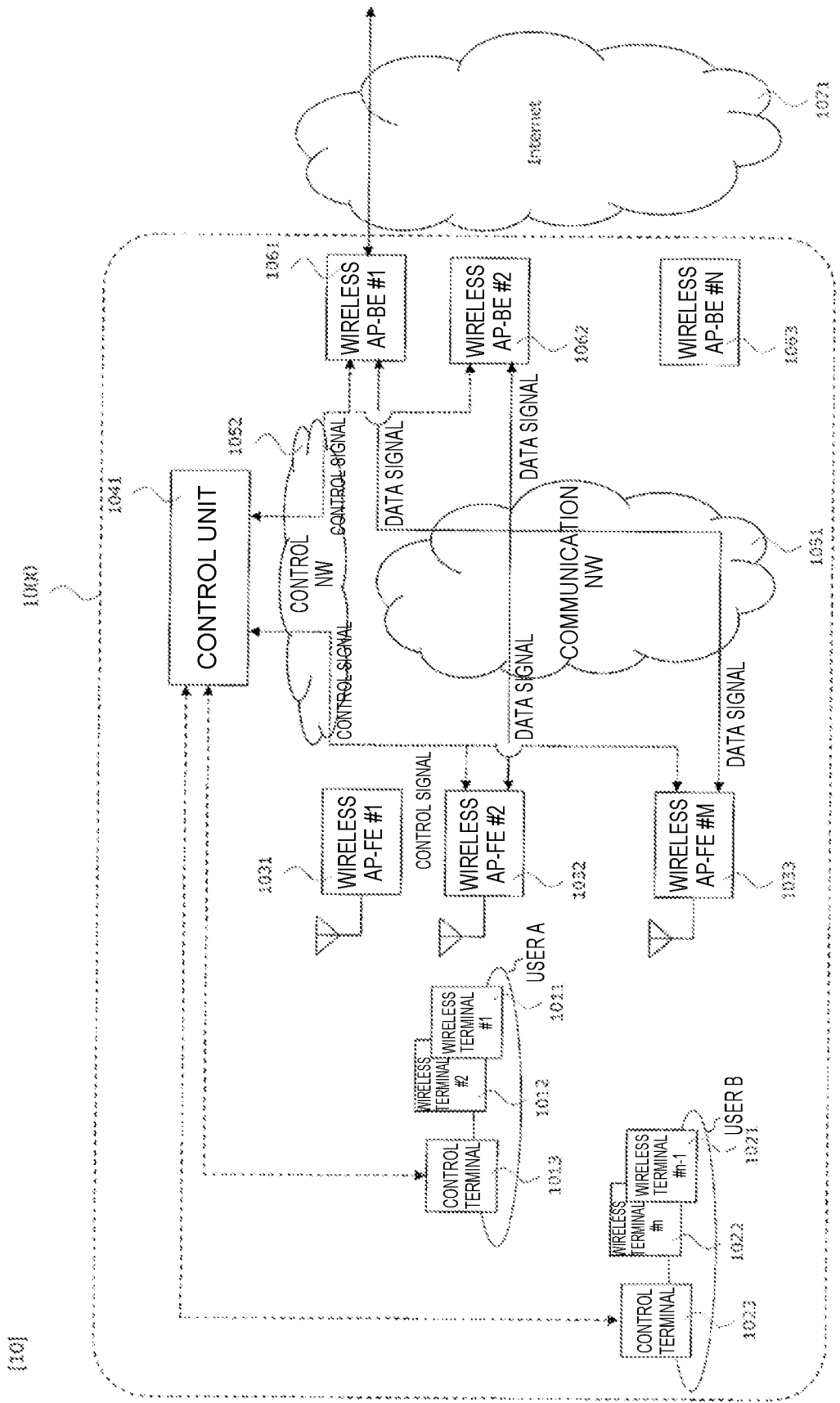
FIG. 10 is a diagram illustrating a communication system according to the present invention.

FIG. 10 is a diagram illustrating a communication system 1000 of this embodiment. The communication network 1000 includes a wireless terminal 1011, a wireless terminal 1012, their control terminal 1013, a wireless terminal 1021, a wireless terminal 1022, their control terminal 1023, a wireless AP-FE #1 1031, a wireless AP-FE #2 1032 to a wireless AP-FE #M 103M, a control unit 1041, a communication NW 1051, a control NW 1052, and a wireless AP-BE #1 1061, a wireless AP-BE #2 1062 to a wireless AP-BE #N 106N. The communication network 1000 communicates with the Internet 1071. Note that it is assumed that the wireless terminal 1011 and the wireless terminal 1021 perform communication using the wireless scheme A, and the wireless terminal 1012 and the wireless terminal 1022 perform communication using the wireless scheme B. Further, it is assumed that the wireless AP-BE #1 1061 is an AP-BE supporting the wireless scheme A, and the AP-BE #2 1062 is an AP-BE supporting the wireless scheme B.

The communication system 1000 has a configuration in which a wireless AP-BE is shared by a plurality of users (the control terminals 1013 and 1023). Further, in the communication system 1000, the users (the control terminals 1013 and 1023) hold wireless terminals of a plurality of wireless schemes (the wireless scheme A and the wireless scheme B), and the wireless terminals are connected to a different wireless AP-BE for each wireless scheme. The control unit 1041 has a database as shown in Table 4 of FIG. 15. That is, the database is described so that one of the back-end units is associated with a plurality of users, and the back-end unit is associated for each wireless scheme of the wireless terminals of the users.

When the wireless terminals start communication within their respective communication areas of the wireless AP-FE #2 1032 and the wireless AP-FE #M 103M, their respective pieces of terminal information are first transmitted from the control terminal 1013 and the control terminal 1023 to the control unit 1041 deployed in an upper network through a user operation using an application or the like. The terminal information includes the wireless scheme of each wireless terminal, information capable of identifying the terminals such as MAC addresses, and current position information of the control terminal 1013 and the control terminal 1023. Here, communication between the control terminal 1013 and the control unit 1041 and between the control terminal 1023 and the control unit 1041 may use a wired communication scheme such as Ethernet, or may use a wireless communication scheme such as licensed radio or unlicensed radio. Further, the wireless terminals and the control terminal 1013 as well as the wireless terminals and the control terminal 1023 may have a configuration in which the functions are separated as shown in FIG. 10, or may have an integrated configuration.

Upon receiving the terminal information transmitted from the control terminal 1013 and the control terminal 1023, the control unit 1041 performs collation with the database prepared in advance as shown in Table 4 based on the wireless scheme, the MAC address, and the like of each wireless terminal, and extracts the wireless AP-BE #1 1061 (the wireless scheme A) or the AP-BE #2 1062 (the wireless scheme B) linked to the wireless schemes of the wireless terminals. Furthermore, the control unit 1041 uses the position information of the control terminal 1013 and the control terminal 1023 to extract wireless AP-FEs that are present at positions close to the control terminals. Specifically, it is sufficient for the control unit 1041 to create in advance a database of information on the position where each wireless AP-FE is located (latitude and longitude information in the case of two dimensions, or latitude, longitude, and altitude information in the case of three dimensions), and search for the wireless AP-FE at the position that is closest to the position of the terminal.

The wireless AP-FE #2 1032 is assigned to the wireless terminals (1011, 1012) owned by the user of the control terminal 1013, and the wireless AP-FE #M 103M is assigned to the wireless terminals (1021, 1022) owned by the user of the control terminal 1023, as the connection destination wireless AP-FEs. When the wireless AP-FEs and the wireless AP-BEs which are to be connected are extracted, the control unit 1041 transmits a control signal to the wireless AP-BE #1 1061, the wireless AP-BE #2 1062, the wireless AP-FE #2 1032, and the wireless AP-FE #M 103M via the control NW 1052. Here, it is assumed that the control signal includes, for example, the terminal information such as the wireless scheme and the MAC address of each wireless terminal, connection information between the wireless AP-BE #1 1061 and the wireless AP-FE #2 1032, connection information between the wireless AP-BE #1 1061 and the wireless AP-FE #M 103M, connection information between the wireless AP-BE #2 1062 and the wireless AP-FE #1 1031, and connection information between the wireless AP-BE #2 1062 and the wireless AP-FE #2 1033. Further, the control unit 1041 transmits a control signal to communication apparatuses constituting the communication NW 1051 between the wireless AP-BE #1 1061 and the wireless AP-FE #2 1032, between the wireless AP-BE #1 1061 and the wireless AP-FE #M 103M, between the wireless AP-BE #2 1062 and the wireless AP-FE #2 1032, and between the wireless AP-BE #2 1062 and the wireless AP-FE #M 103M. By changing the set values of the communication apparatuses based on the control signal, the communication NW 1051 is made controllable by the control unit 1041.

Signals transmitted from the wireless terminals via radio waves are received by the wireless AP-FE #2 1032 and the wireless AP-FE #M 103M, respectively, and transmitted to the wireless AP-BE #1 1061 or the wireless AP-BE #2 1062 via the communication NW 1051. Here, the wireless AP-FE #2 1032 and the wireless AP-FE #M 103M convert the received RF signals into optical signals by E/O conversion, and transmit them to the wireless AP-BE #1 1061 and the wireless AP-BE #2 1062. Further, the communication NW 1051 is a network that transmits an RF signal as an optical signal, and may optically transmit a signal obtained by E/O-converting the carrier frequency used by each wireless terminal as it is, or may optically transmit a signal obtained by E/O-converting an IF signal that is obtained by frequency conversion from the carrier frequency, and the frequency of the RF signal does not matter. In this way, a signal from each wireless terminal is transmitted to the upper-level Internet 1071 via the wireless AP-FE #2 1032 or the wireless AP-FE #M 103M, the communication NW 1051, and the wireless AP-BE #1 1061 or the wireless AP-BE #2 1062.

A specific example of an uplink signal transmission method will be given. It is assumed that the wireless terminal 1011 and the wireless terminal 1021 transmit uplink signals by radio waves at a frequency A, and the wireless terminal 1012 and the wireless terminal 1022 transmit uplink signals by radio waves at a frequency B. The wireless AP-FE #2 1032 and the wireless AP-FE #M 103M convert their respective received uplink signals into Radio-over-Fiber signals, and transmit them to the communication NW 1051. Note that transmission source user information and the destination wireless AP-BEs have been given to the Radio-over-Fiber signals based on a control signal from the control unit 1041. The communication NW 1051 inputs these Radio-over-Fiber signals to the wireless AP-BE #1 1061 for the radio frequency of the wireless terminal 1011 and the wireless terminal 1021, and to the wireless AP-BE #2 1062 for the radio frequency of the wireless terminal 1012 and the wireless terminal 1022. The wireless AP-BE #1 1061 and the wireless AP-BE #2 1062 receive the two Radio-over-Fiber signals from different users, and after reception, separate the two uplink signals for the respective users to obtain the desired signals. In this specific example, a case where the difference between the wireless schemes is the difference between the radio frequencies has been described. The difference between the wireless schemes may be not only the difference between the radio frequencies but also the difference between modulation schemes. For example, the wavelength multiplexing scheme and the optical switch scheme can be applied.

On the other hand, a downlink signal is transmitted from the wireless AP-BE #1 1061 or the wireless AP-BE #2 1062 to the wireless AP-FE #2 1032 or the wireless AP-FE #M 103M via the communication NW 1051. In the wireless AP-FE #2 1032 and the wireless AP-FE #M 103M, the signals are O/E-converted, and the signals after the O/E conversion are transmitted to the wireless terminals via radio waves.

A specific example of a downlink signal transmission method will be given. The wireless AP-BE #1 1061 and the wireless AP-BE #2 1062 each receive downlink signals from the Internet 1071. The wireless AP-BE #1 1061 and the wireless AP-BE #2 1062 are given the destination wireless AP-FEs of the downlink signals based on a control signal from the control unit 1041 (the wireless AP-BE #1 1061 and the wireless AP-BE #2 1062 may inquire of the control unit 1041 about the destinations of the downlink signals). The wireless AP-BE #1 1061 converts the downlink signals into RF signals at the frequency A, assigns the destination addresses of the wireless AP-FEs for the destination users to the respective downlink signals, and converts them into Radio-over-Fiber signals. The wireless AP-BE #2 1062 converts the downlink signals into RF signals at the frequency B, assigns the destination addresses of the wireless AP-FEs for the destination users to the respective downlink signals, and converts them into Radio-over-Fiber signals. The wireless AP-BE #1 1061 and the wireless AP-BE #2 1062 transmit the Radio-over-Fiber signals to the communication NE 1051. The wireless AP-FE #2 1032 receives the Radio-over-Fiber signals addressed to itself, converts them into radio downlink signals (at the frequencies A and B), and transmits them to the wireless terminal 1011 and the wireless terminal 1012. Further, the wireless AP-FE #M 103M also receives the Radio-over-Fiber signals addressed to itself, converts them into radio downlink signals (at the frequencies A and B), and transmits them to the wireless terminal 1021 and the wireless terminal 1022. In this specific example, a case where the difference between the wireless schemes is the difference between the radio frequencies has been described. The difference between the wireless schemes may be not only the difference between the radio frequencies but also the difference between modulation schemes. For example, the wavelength multiplexing scheme and the optical switch scheme can also be applied to downlink signals as in the other examples described for uplink signals.

As described above, deploying the wireless AP-FE #2 1032 and the wireless AP-FE #M 103M and the communication NW 1051 capable of optically transmitting RF signals among the wireless terminals, the AP-BE #1 1061, and the AP-BE #2 1062 produces the same effect as an increase in the transmission distance of the wireless section between the wireless terminal and the wireless AP. As a result, it is sufficient that radio signal processing units supporting the wireless schemes of the wireless terminals are deployed only in the wireless AP-BE #1 1061 and the wireless AP-BE #2 1062, and they are not required for the wireless AP-FE #2 1032 and the wireless AP-FE #M 103M. Accordingly, if the wireless AP-FE #2 1032 and the wireless AP-FE #M 103M that implement only relatively simple processing such as E/O conversion are present near the wireless terminals, it becomes possible for the wireless terminals to be always connected to the private wireless AP-BE #1 1061 and AP-BE #2 1062 at remote locations.

Tenth Embodiment

Figure 11:
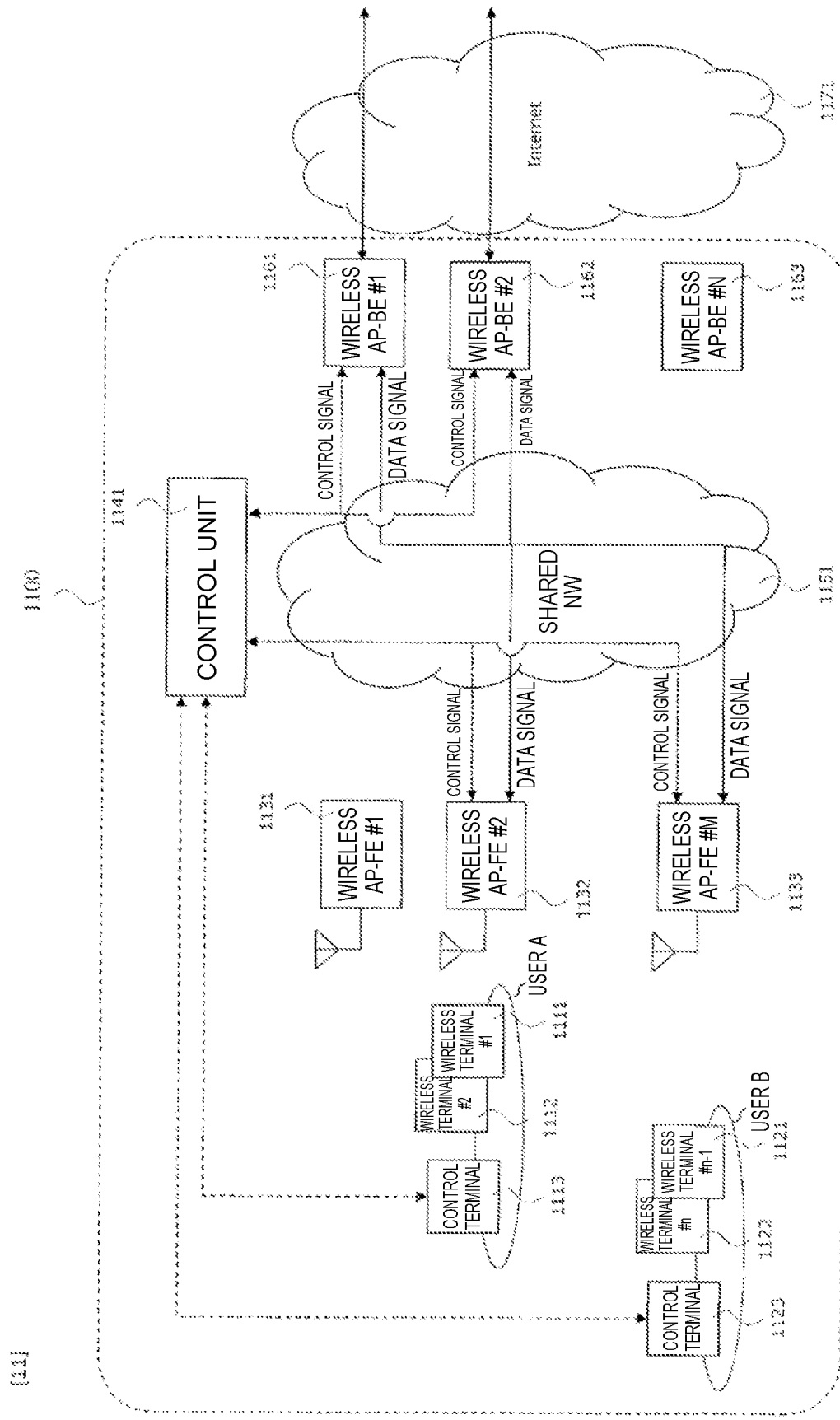
FIG. 11 is a diagram illustrating a communication system according to the present invention.

FIG. 11 is a diagram illustrating a communication system 1100 of this embodiment. The communication network 1100 includes a wireless terminal 1111, a wireless terminal 1112, their control terminal 1113, a wireless terminal 1121, a wireless terminal 1122, their control terminal 1123, a wireless AP-FE #1 1131, a wireless AP-FE #2 1132 to a wireless AP-FE #M 113M, a control unit 1141, a shared NW 1151, and a wireless AP-BE #1 1161, a wireless AP-BE #2 1162 to a wireless AP-BE #N 116N. The communication network 1100 communicates with the Internet 1171. Note that it is assumed that the wireless terminal 1111 and the wireless terminal 1121 perform communication using the wireless scheme A, and the wireless terminal 1112 and the wireless terminal 1122 perform communication using the wireless scheme B. Further, it is assumed that the wireless AP-BE #1 1161 is an AP-BE supporting the wireless scheme A, and the AP-BE #2 1162 is an AP-BE supporting the wireless scheme B.

The communication system 1100 has a configuration in which a wireless AP-BE is shared by a plurality of users (the control terminals 1113 and 1123). Further, in the communication system 1100, the users (the control terminals 1113 and 1123) hold wireless terminals of a plurality of wireless schemes (the wireless scheme A and the wireless scheme B), and the wireless terminals are connected to a different wireless AP-BE for each wireless scheme. The control unit 1141 has a database as shown in Table 4 of FIG. 15. That is, the database is described so that one of the back-end units is associated with a plurality of users, and the back-end unit is associated for each wireless scheme of the wireless terminals of the users.

When the wireless terminals start communication within their respective communication areas of the wireless AP-FE #2 1132 and the wireless AP-FE #3 113M, their respective pieces of terminal information are first transmitted from the control terminal 1113 and the control terminal 1123 to the control unit 1141 deployed in an upper network through a user operation using an application or the like. The terminal information includes the wireless scheme of each wireless terminal, information capable of identifying the terminals such as MAC addresses, and current position information of the control terminal 1113 and the control terminal 1123. Here, communication between the control terminal 1113 and the control unit 1141 and between the control terminal 1123 and the control unit 1141 may use a wired communication scheme such as Ethernet, or may use a wireless communication scheme such as licensed radio or unlicensed radio. Further, the wireless terminals and the control terminal 1113 as well as the wireless terminals and the control terminal 1123 may have a configuration in which the functions are separated as shown in FIG. 11, or may have an integrated configuration.

Upon receiving the terminal information transmitted from the control terminal 1113 and the control terminal 1123, the control unit 1141 performs, for example, collation with the database prepared in advance as shown in Table 4 based on the wireless scheme, the MAC address, and the like of each wireless terminal, and extracts the wireless AP-BE #1 1161 (the wireless scheme A) or the AP-BE #2 1162 (the wireless scheme B) linked to the wireless schemes of the wireless terminals. Furthermore, the control unit 1141 uses the position information of the control terminal 1113 and the control terminal 1123 to extract wireless AP-FEs that are present at positions close to the control terminals. Specifically, it is sufficient for the control unit 1141 to create in advance a database of information on the position where each wireless AP-FE is located (latitude and longitude information in the case of two dimensions, or latitude, longitude, and altitude information in the case of three dimensions), and search for the wireless AP-FE at the position that is closest to the position of the terminal.

The wireless AP-FE #2 1132 is assigned to the wireless terminals (1111, 1112) owned by the user of the control terminal 1113, and the wireless AP-FE #M 113M is assigned to the wireless terminals (1121, 1122) owned by the user of the control terminal 1123, as the connection destination wireless AP-FEs. When the wireless AP-FEs and the wireless AP-BEs which are to be connected are extracted, the control unit 1141 transmits a control signal to the wireless AP-BE #1 1161, the wireless AP-BE #2 1162, the wireless AP-FE #2 1132, and the wireless AP-FE #M 113M via the shared NW 1151. Here, it is assumed that the control signal includes, for example, the terminal information such as the wireless scheme and the MAC address of each wireless terminal, connection information between the wireless AP-BE #1 1161 and the wireless AP-FE #2 1132, connection information between the wireless AP-BE #1 1161 and the wireless AP-FE #M 113M, connection information between the wireless AP-BE #2 1162 and the wireless AP-FE #1 1131, and connection information between the wireless AP-BE #2 1162 and the wireless AP-FE #2 113M. Further, the control unit 1141 transmits a control signal to communication apparatuses constituting the shared NW 1151 between the wireless AP-BE #1 1161 and the wireless AP-FE #2 1132 between the wireless AP-BE #1 1161 and the wireless AP-FE #M 113M, between the wireless AP-BE #2 1162 and the wireless AP-FE #2 1132, and between the wireless AP-BE #2 1162 and the wireless AP-FE #M 113M. By changing the set values of the communication apparatuses based on the control signal, the shared NW 1151 is made controllable by the control unit 1141.

Signals transmitted from the wireless terminals via radio waves are received by the wireless AP-FE #2 1132 and the wireless AP-FE #M 113M, respectively, and transmitted to the wireless AP-BE #1 1161 or the wireless AP-BE #2 1162 via the shared NW 1151. Here, the wireless AP-FE #2 1132 and the wireless AP-FE #M 113M convert the received RF signals into optical signals by E/O conversion, and transmit them to the wireless AP-BE #1 1161 and the wireless AP-BE #2 1162. Further, the shared NW 1151 is a network that transmits an RF signal as an optical signal, and may optically transmit a signal obtained by E/O-converting the carrier frequency used by each wireless terminal as it is, or may optically transmit a signal obtained by E/O-converting an IF signal that is obtained by frequency conversion from the carrier frequency, and the frequency of the RF signal does not matter. In this way, a signal from each wireless terminal is transmitted to the upper-level Internet 1171 via the wireless AP-FE #2 1132 or the wireless AP-FE #M 113M, the shared NW 1151, and the wireless AP-BE #1 1161 or the wireless AP-BE #2 1162.

A specific example of an uplink signal transmission method will be given. It is assumed that the wireless terminal 1111 and the wireless terminal 1121 transmit uplink signals by radio waves at a frequency A, and the wireless terminal 1112 and the wireless terminal 1122 transmit uplink signals by radio waves at a frequency B. The wireless AP-FE #2 1132 and the wireless AP-FE #M 113M convert their respective received uplink signals into Radio-over-Fiber signals, and transmit them to the communication NW 1151. Note that transmission source user information and the destination wireless AP-BEs have been given to the Radio-over-Fiber signals based on a control signal from the control unit 1141. The communication NW 1151 inputs these Radio-over-Fiber signals to the wireless AP-BE #1 1161 for the radio frequency of the wireless terminal 1111 and the wireless terminal 1121, and to the wireless AP-BE #2 1162 for the radio frequency of the wireless terminal 1112 and the wireless terminal 1122. The wireless AP-BE #1 1161 and the wireless AP-BE #2 1162 receive the two Radio-over-Fiber signals from different users, and after reception, separate the two uplink signals for the respective users to obtain the desired signals. In this specific example, a case where the difference between the wireless schemes is the difference between the radio frequencies has been described. The difference between the wireless schemes may be not only the difference between the radio frequencies but also the difference between modulation schemes. For example, the wavelength multiplexing scheme and the optical switch scheme can be applied.

On the other hand, a downlink signal is transmitted from the wireless AP-BE #1 1161 or the wireless AP-BE #2 1162 to the wireless AP-FE #2 1132 or the wireless AP-FE #M 113M via the shared NW 1151. In the wireless AP-FE #2 1132 and the wireless AP-FE #M 113M, the signals are O/E-converted, and the signals after the O/E conversion are transmitted to the wireless terminals via radio waves.

A specific example of a downlink signal transmission method will be given. The wireless AP-BE #1 1161 and the wireless AP-BE #2 1162 each receive downlink signals from the Internet 1171. The wireless AP-BE #1 1161 and the wireless AP-BE #2 1162 are given the destination wireless AP-FEs of the downlink signals based on a control signal from the control unit 1141 (the wireless AP-BE #1 1161 and the wireless AP-BE #2 1162 may inquire of the control unit 1141 about the destinations of the downlink signals). The wireless AP-BE #1 1161 converts the downlink signals into RF signals at the frequency A, assigns the destination addresses of the wireless AP-FEs for the destination users to the respective downlink signals, and converts them into Radio-over-Fiber signals. The wireless AP-BE #2 1162 converts the downlink signals into RF signals at the frequency B, assigns the destination addresses of the wireless AP-FEs for the destination users to the respective downlink signals, and converts them into Radio-over-Fiber signals. The wireless AP-BE #1 1161 and the wireless AP-BE #2 1162 transmit the Radio-over-Fiber signals to the communication NE 1151. The wireless AP-FE #2 1132 receives the Radio-over-Fiber signals addressed to itself, converts them into radio downlink signals (at the frequencies A and B), and transmits them to the wireless terminal 1111 and the wireless terminal 1112. Further, the wireless AP-FE #M 113M also receives the Radio-over-Fiber signals addressed to itself, converts them into radio downlink signals (at the frequencies A and B), and transmits them to the wireless terminal 1121 and the wireless terminal 1122. In this specific example, a case where the difference between the wireless schemes is the difference between the radio frequencies has been described. The difference between the wireless schemes may be not only the difference between the radio frequencies but also the difference between modulation schemes. For example, the wavelength multiplexing scheme and the optical switch scheme can also be applied to downlink signals as in the other examples described for uplink signals.

As described above, deploying the wireless AP-FE #2 1132 and the wireless AP-FE #M 113M and the shared NW 1151 capable of optically transmitting RF signals among the wireless terminals, the AP-BE #1 1161, and the AP-BE #2 1162 produces the same effect as an increase in the transmission distance of the wireless section between the wireless terminal and the wireless AP. As a result, it is sufficient that radio signal processing units supporting the wireless schemes of the wireless terminals are deployed only in the wireless AP-BE #1 1161 and the wireless AP-BE #2 1162, and they are not required for the wireless AP-FE #2 1132 and the wireless AP-FE #M 113M. Accordingly, if the wireless AP-FE #2 1132 and the wireless AP-FE #M 113M that implement only relatively simple processing such as E/O conversion are present near the wireless terminals, it becomes possible for the wireless terminals to be always connected to the private wireless AP-BE #1 1161 and AP-BE #2 1162 at remote locations.

REFERENCE SIGNS LIST

200, 300, 400, 500, 600, 700, 800, 900, 1000, 1100
    Communication system

The invention claimed is:

1. A communication system having a function of an access point that connects the Internet and at least one wireless terminal, comprising:
    a front-end unit that forms a wireless area, and performs wireless communication with the wireless terminal;
    at least one back-end unit that is connected to the Internet;
    a network that connects the front-end unit and the back-end unit; and
    a control unit that has a database that describes a relationship with the back-end unit corresponding to identification information of the wireless terminal, and controls the network so that an uplink signal from the wireless terminal and a downlink signal from the Internet are transmitted between the front-end unit and the back-end unit,
    wherein the control unit has:
    a function of collecting terminal information including identification information and position information of the wireless terminal from the wireless terminal;
    a function of selecting the front-end unit close to the wireless terminal based on the position information;
    a function of selecting the back-end unit corresponding to the identification information collected from the wireless terminal according to the database; and
    a function of setting the network so that the selected front-end unit and the selected back-end unit are connected to each other.

2. The communication system according to claim 1, wherein the network is based on a Radio over Fiber (RoF) scheme.

3. The communication system according to claim 1, wherein the database is described so that one of the at least one back-end unit corresponds to one user of the wireless terminal.

4. The communication system according to claim 1, wherein the database is described so that one of the at least one back-end unit is associated with one user, and the back-end unit is associated for each wireless scheme of the wireless terminal of the user.

5. The communication system according to claim 1, wherein the at least one wireless terminal comprises a plurality of wireless terminals, and the database is described so that one of the at least one back-end unit corresponds to a plurality of users of the wireless terminals.

6. The communication system according to claim 1, wherein the at least one wireless terminal comprises a plurality of wireless terminals, and the database is described so that one of the at least one back-end unit is associated with a plurality of users, and the back-end unit is associated for each wireless scheme of the wireless terminals of the users.

* * * * *